(12) United States Patent
Ducheneaut et al.

(10) Patent No.: US 7,720,777 B2
(45) Date of Patent: May 18, 2010

(54) METHOD, DEVICE, AND PROGRAM PRODUCT TO MONITOR THE SOCIAL HEALTH OF A PERSISTENT VIRTUAL ENVIRONMENT

(75) Inventors: Nicolas B Ducheneaut, Mountain View, CA (US); Robert D Moore, San Jose, CA (US); Eric S Nickell, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1072 days.

(21) Appl. No.: 11/402,568

(22) Filed: Apr. 11, 2006

(65) Prior Publication Data

US 2007/0240119 A1    Oct. 11, 2007

(51) Int. Cl.
G06F 17/00    (2006.01)
G06N 5/02    (2006.01)
(52) U.S. Cl. ...................................... 706/45
(58) Field of Classification Search ............... 706/45
See application file for complete search history.

(56) References Cited

U.S. PATENT DOCUMENTS 6,243,714 B1 *  6/2001  Shapiro et al. .............. 707/201
6,651,050 B2 * 11/2003  Shafrir et al. .................. 707/2
7,389,512 B2 *  6/2008  Tucker ....................... 719/313
7,398,223 B2 *  7/2008  Kahlert et al. ................ 705/10
7,437,556 B2 * 10/2008  Tucker et al. ................ 713/164
7,526,774 B1 *  4/2009  Beck et al. ................... 719/320

OTHER PUBLICATIONS

Supporting transcontinental collaborative work in persistent virtual environments Leigh, J.; Johnson, A.E.; Computer Graphics and Applications, IEEE vol. 16, Issue 4, Jul. 1996 pp. 47-51 Digital Object Identifier 10.1109/38.511853.*
Multi-perspective collaborative design in persistent networked virtual environments, Leigh, J.; Johnson, A.E.; Vasilakis, C.A.; DeFanti, T.A.; Virtual Reality Annual International Symposium, 1996., Proceedings of the IEEE 1996 Digital Object Identifier: 10.1109/VRAIS.1996.490535 Publication Year: 1996 , pp. 253-260, 271-273.*
Supporting transcontinental collaborative work in persistent virtual environments, Leigh, J.; Johnson, A.E.; Computer Graphics and Applications, IEEE vol. 16 , Issue: 4 Digital Object Identifier: 10.1109/38.511853 Publication Year: 1996 , pp. 47-51.*
Persistent issues in the application of virtual environment systems to training, Caird, J.K.; Human Interaction with Complex Systems, 1996. HICS '96. Proceedings., Third Annual Symposium on Digital Object Identifier: 10.1109/HUICS.1996.549502 Publication Year: 1996 , pp. 124-132.*

(Continued)

Primary Examiner—Michael B Holmes
(74) Attorney, Agent, or Firm—Park, Vaughan & Fleming LLP

(57) ABSTRACT

Device, method, and computer program product for monitoring the social health of a persistent virtual environment. The disclosed technology monitors social interactions between subscribers of on-line entities who have interactions related to the persistent virtual environment.

39 Claims, 16 Drawing Sheets

OTHER PUBLICATIONS

Hackathorn, R., "*The Link is the thing, Part 1*", DM Review, Aug. 2003. Printed from DMReview.com.

Hackathorn, R., "*The Link is the thing, Part 2*", DM Review, Sep. 2003. Printed from DMReview.com.

Hackathorn, R., "*The Link is the thing, Part 3*", DM Review, Oct. 2003. Printed from DMReview.com.

Smith, M.A. et al., "*Visualization Components for Persistent Conversations*", Collaboration & Multimedia Group, Microsoft Research, Technical Report MSR-TR-2000-98, Sep. 2000.

Ducheneaut, N., "*A Socio-Technical Analysis of Socialization in Open Source Projects*", Apr. 4, 2006 http://www2.parc.com/csl/members/nicolas/browser.html.

Ducheneaut, N., "*Socialization in an Open Source Software Community: A Socio-Technical Analysis*", Computer Supported Cooperative Work, vol. 14, No. 4, Aug. 2005, pp. 323-368.

Cook, J., "*Social Networks: A Primer*", Department of Sociology, Duke University, Jan. 6, 2001.

Sack, W., "*Conversation Map: An Interface for Very-Large-Scale Conversations*", Journal of Management Information Systems, Winter 2000, vol. 17, No. 3, pp. 73-92.

\* cited by examiner

METHOD, DEVICE, AND PROGRAM PRODUCT TO MONITOR THE SOCIAL HEALTH OF A PERSISTENT VIRTUAL ENVIRONMENT

CROSS-REFERENCE TO RELATED APPLICATIONS

The following United States patent applications have been filed herewith: U.S. patent application Ser. No. 11/402,399, having the same inventors, entitled METHOD, DEVICE, AND PROGRAM PRODUCT FOR A SOCIAL DASHBOARD ASSOCIATED WITH A PERSISTENT VIRTUAL ENVIRONMENT.

STATEMENT REGARDING FEDERALLY SPONSORED RESEARCH OR DEVELOPMENT (Not applicable)

INCORPORATION-BY-REFERENCE OF MATERIAL SUBMITTED ON A COMPACT DISC (Not applicable)

BACKGROUND

1. Technical Field

The disclosed technology relates to the fields of monitoring persistent virtual environments and Social Network Analysis of on-line entities within the persistent virtual environment.

2. Background Art

Massively Multiplayer Online Games (MMOGs) are becoming increasingly popular with subscribers in the millions. The MMOG providers sell a product (the software executed on a player's computer) and a service (by making a persistent virtual environment available to the account holder) for a periodic subscription fee. Thus, account holder retention is financially important to the MMOG provider because the longer the player associated with the account holder remains involved with the MMOG, the longer the MMOG provider receives subscription income. Hence, the MMOG providers are motivated to create and sustain healthy, long lived, online player communities.

Maintaining and increasing subscriber motivation to continue the subscription is a major business focus of the game industry. However, no diagnostic tools are available to timely measure the social aspects of player interactions in the persistent virtual environment or to measure or monitor the health of the online player community in a persistent virtual environment. While the MMOG provider can gather massive amounts of information about the persistent virtual environment, this information must be analyzed at high cost with, for example, Microsoft® Excel® or SPSS®. Thus, it is difficult, expensive and time consuming for the MMOG provider to monitor the social health of the persistent virtual environment and the analysis results only reflect the state of the persistent virtual environment at the time the data was collected. Thus the analysis is not timely, has no capability to forecast problems, and only operates from single source of information.

Microsoft, Excel, are registered trademarks of Microsoft Corporation of Redmond Wash. SPSS is a registered trademark of SPSS Inc., of Chicago, Ill.

Marc Smith et al. in *Visualization Components for Persistent Conversations*, Proceedings of CHI'2001 (Seattle Wash., April 1998), ACM Press, pages 136-143, teaches analyzing and presenting a snapshot visualization of interpersonal connections extracted from newsgroup communications.

Warren Sack, in *Conversation Map: An Interface for Very-Large-Scale Conversations*, Journal of Management Information Systems, Winter 2000, Vol. 17, No. 3, pages 73-92, taught a series of visualization panels to analyze social interactions in newsgroup to help readers navigate the newsgroup's information space.

Smith and Sack only teach analyzing data from a single information source (the newsgroup).

Nicolas Ducheneaut, in *Socialization in an Open Source software community: A socio-technical analysis*, Computer Supported Cooperative Work, 14(4), pages 323-368, taught techniques for visualizing interactions between people and interactions between people and things (for example, software code) over time. Ducheneaut teaches accessing a variety of information sources, but is narrowly focused to Open Source Software development projects.

It would be advantageous to provide a way to timely monitor persistent virtual environments and to measure, monitor, and treat the health of online player communities within persistent virtual environments.

DETAILED DESCRIPTION

Aspects of the disclosed technology include methods, devices and program products that acquire social interaction information between on-line entities that participate in a persistent virtual environment. The social interaction information is analyzed to create a metric that represents a social aspect of the persistent virtual environment. A visualization responsive to the metric is presented.

Figure 1:
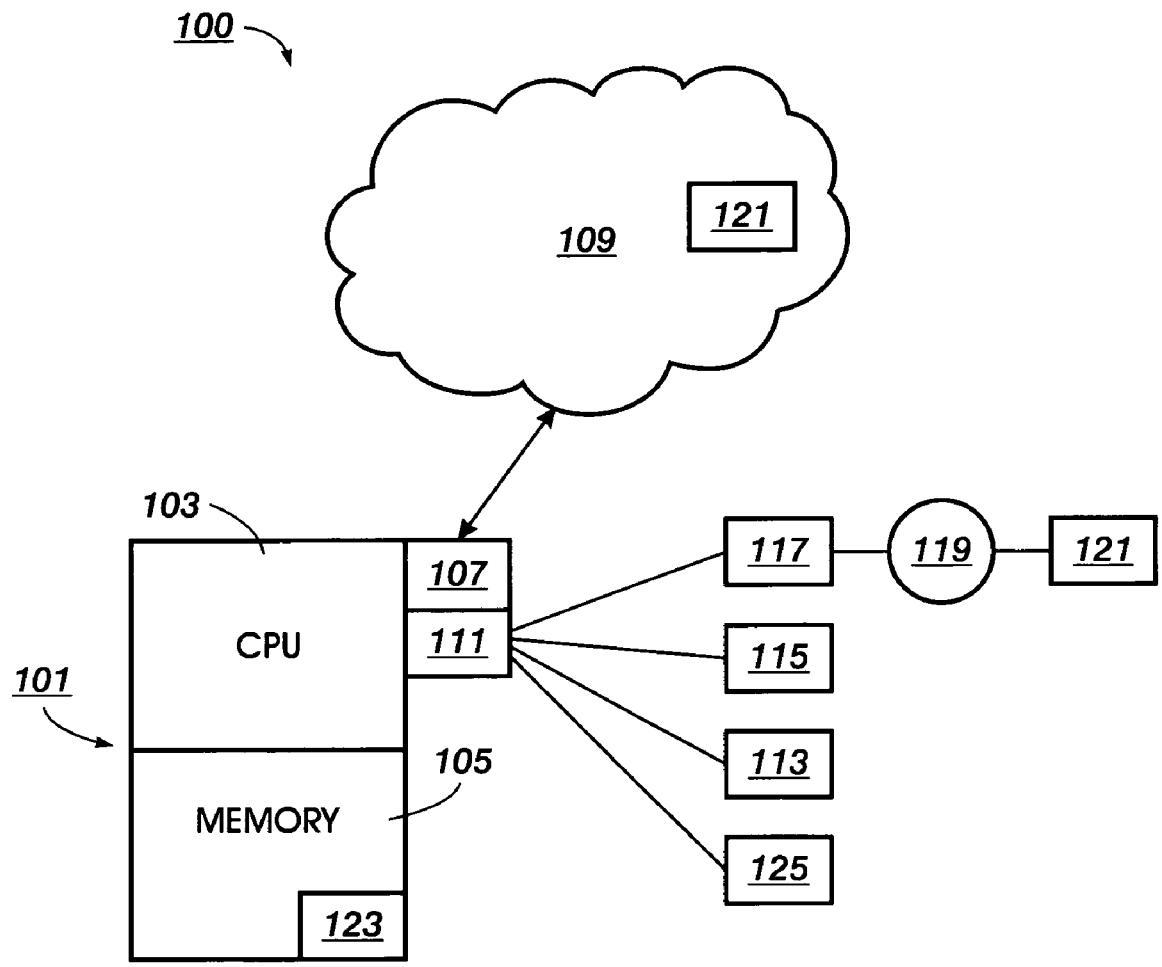
FIG. 1 illustrates a networked computer system in accordance with a preferred embodiment.

FIG. 1 illustrates a networked computer system 100 that can incorporate and embodiment. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a ROM within the device, within replaceable ROM, in a computer-usable data carrier such as a memory stick, CD, floppy, DVD or any other tangible media) that typically contains a program product 121. The user interface device(s) 113 can include a display device 125. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network transmits information (such as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted from one point to another. Programs and data are commonly read from both tangible physical media (such as those listed above) and from the network 109. Thus, the network 109, like a tangible physical media, is a computer-usable data carrier. One skilled in the art will understand that not all of the displayed features of the computer 101 need to be present for the all embodiments that implement the techniques disclosed herein.

Figure 2:
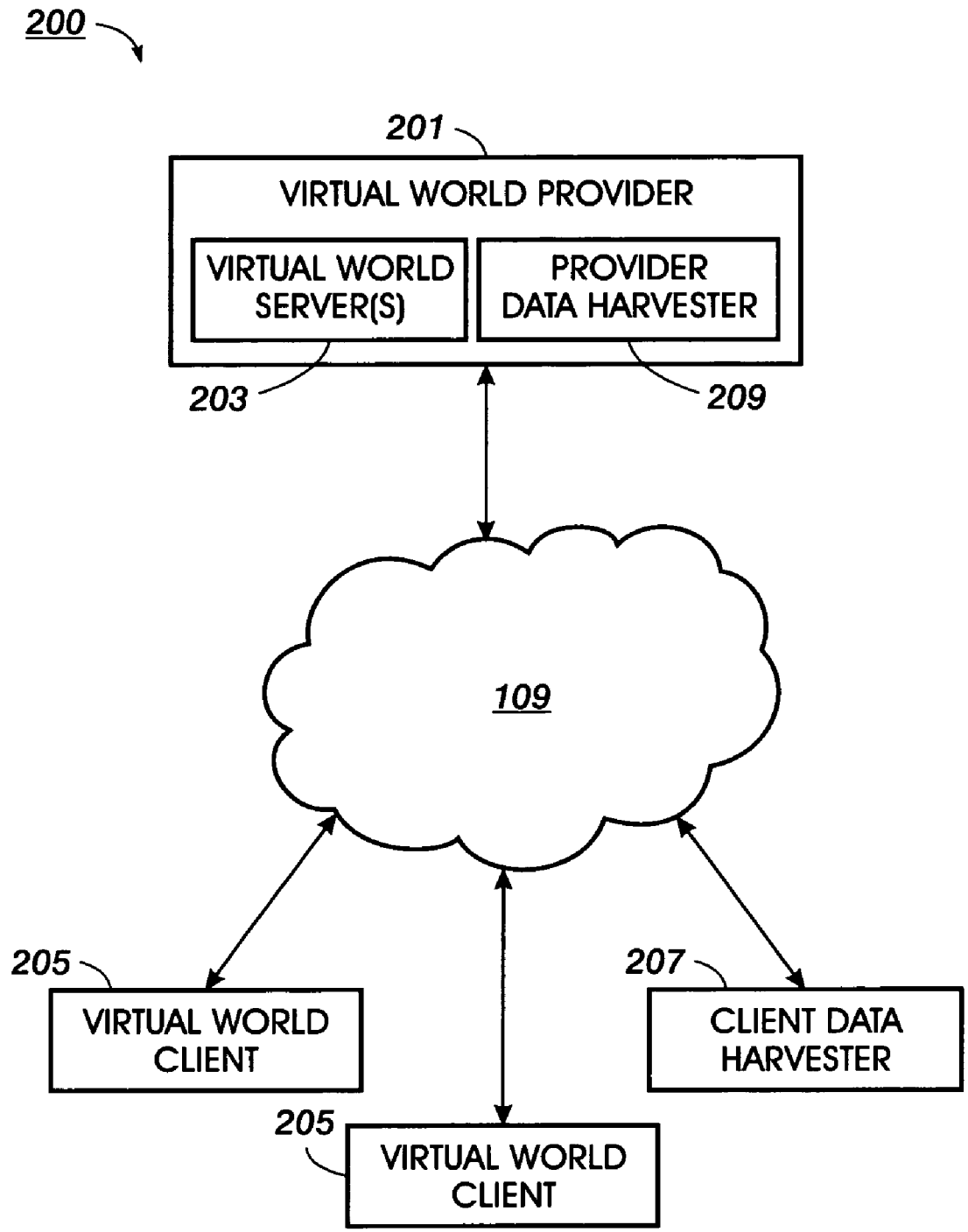
FIG. 2 illustrates a persistent virtual environment.

FIG. 2 illustrates a persistent virtual environment 200 that is made available by a virtual world provider 201 that generally programs, maintains, and controls a virtual world server (s) 203 that provides a simulated environment within which players can enter and so become virtually present as on-line entities within the persistent virtual environment 200. The simulated environment is a persistent virtual environment in that the simulated environment is maintained by the virtual world provider 201 even if no on-line entities are virtually present within the environment. Some examples of persistent virtual environments are, without limitation, a multiplayer online game, a virtual office, a virtual resort, a social online world, a online learning system, a virtual classroom, an online training system, an online collaborative interaction space, and a virtual representation of a real world attraction. A social online world is, for example, a persistent virtual environment that does not have a game-like goal for the player but still allows the player to experience new sights and activities in the persistent virtual environment as well as to develop social relationships of other players in the persistent virtual environment. A collaborative interaction space is a persistent virtual environment that allows multiple players to simultaneously navigate an information space. The information space can be as broad, for example, as a three dimensional representation of the Internet, or as focused as a three dimensional representation of an object-oriented debugging system.

One aspect of the persistent virtual environment 200 can be a client data harvester 207 and/or a provider data harvester 209. These data harvesters repeatedly gather social interaction information to determine an on-line entity's social ties in the persistent virtual environment 200. Additional information can be harvested from the persistent virtual environment 200 such as the on-line entity's possessions, location, profession, skills, experience, player association membership etc. The provider data harvester 209 generally can access more private account holder information than can the client data harvester 207 because the virtual world provider 201 imposes more access restrictions on client computers such as the client data harvester 207.

The term "social interaction information" includes the time the information was acquired as well an any type of on-line entity data acquired by a data harvester, or that can be associated with on-line entity data acquired by a data harvester. Examples of social interaction information include, without limitation, time information, on-line entity identification information, communication content information, communication type information, communication source information, and audience identification information.

The client data harvester 207 interfaces to the virtual world server(s) 203 through one or more application programming interfaces (API) generally provided or authorized by the virtual world provider 201 (for example, as a programming interface to a specific computer programming language, or as "macros" provided to automate player actions). However, the client data harvester 207 will generally be limited in the number and/or type of interactions it can make to the virtual world server(s) 203. This can limit the amount of social interaction information that can be captured by the client data harvester 207 and/or can extend the time required to capture the social interaction information. In addition the client data harvester 207 generally does not have access to any social interaction information other than that which would be available to a player through his/her on-line entity (for example, the client data harvester 207 generally does not have access to another account holder's account information). The provider data harvester 209 however does not have the performance restrictions of the client data harvester 207 nor need it be restricted from access to account information.

A player in a persistent virtual environment may have multiple personas in that environment. Each persona is a separate on-line entity within the persistent virtual environment. Unless the player discloses player-specific information to other players or the MMOG provider provides facilities to do so, the actions, communications, and characteristics of the player's on-line entity is the only source of information available to other on-line entities. Thus, a player refers to an actual person or computerized robot that controls the on-line entity (such as an avatar) in the persistent virtual environment. The account holder is the real-world entity who has subscribed to the persistent virtual environment (who may also be a player), the on-line entity is the avatar in the persistent virtual environment that is controlled by the player. On-line entities can establish player associations such as guilds, cities, clans, etc. The industry term "player association" is generally an association of on-line entities and not generally of "players" as these terms are used herein. Player association, as used herein, includes a goal directed temporary association (a "party"—such as a "hunting party") created by associating multiple players who agree to cooperate for a period of time or to achieve a goal.

The player can become virtually present within the persistent virtual environment 200 by using a virtual world client 205 to "login" to the persistent virtual environment 200. In this way, the player controls an on-line entity in the persistent virtual environment 200. The virtual world client 205 communicates over the network 109 to the virtual world server(s) 203 and presents to information about the persistent virtual environment 200 to the player (such as by presenting textual, visual, audio, or other information to the player's senses). The player causes the player's on-line entity to interact with other players' on-line entities, with non-player entities, or with virtual objects in the persistent virtual environment 200.

The persistent virtual environment 200 can provide access to newsgroups and other communication forums (not shown) that are commonly accessible through the network 109. Generally, each of the virtual world server(s) 203 has its own separate persistent virtual environment. Some MMOG providers may provide persistent virtual environments that integrate across the servers.

Figure 3:
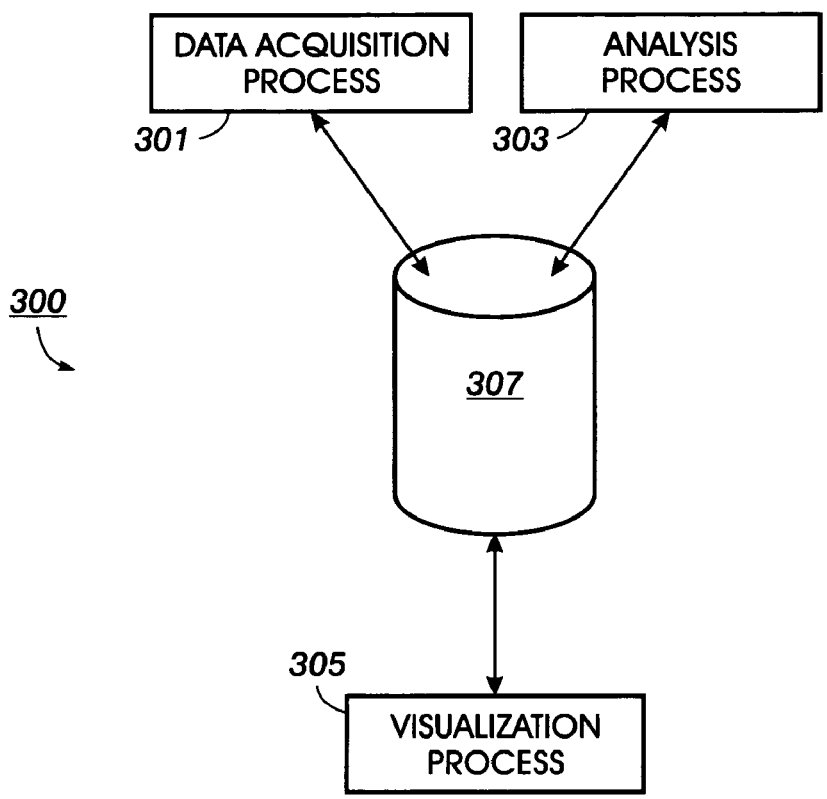
FIG. 3 illustrates architecture for a persistent virtual environment dashboard.

FIG. 3 illustrates an architecture for a persistent virtual environment dashboard 300 that can be used to timely monitor persistent virtual environments, and to measure or monitor the health of the online player communities within persistent virtual environments. The architecture for a persistent virtual environment dashboard 300 includes a 'data acquisition' process 301, an 'analysis' process 303, a 'visualization' process 305, and a data storage 307. In one embodiment, the 'data acquisition' process 301, the 'analysis' process 303 and the 'visualization' process 305 are individual threads or tasks that continually or periodically execute to store data to, or access data from, the data storage 307. The 'data acquisition' process 301 can execute in the client data harvester 207 or in the provider data harvester 209. The 'analysis' process 303 generally executes at a processor that has fast access to the data storage 307. The 'visualization' process 305 can execute at any processor that has reasonable access to the data storage 307. In addition some of the visualization processing can be accessed by a remote procedure calls to invoke remote procedures located at processors that have fast access to the data storage 307.

The 'data acquisition' process 301 monitors one of the virtual world server(s) 203 to acquire social interaction information from communications and acts between players of on-line entities in the persistent virtual environment. The social interaction information includes communications made by the players across channels (for example, those communications made via in-game group chat, private messaging, public talk, persistent virtual environment mail messages, and economic transactions). Additional communications can also be obtained from sources outside the persistent virtual environment such as message postings on forums related to the persistent virtual environment, etc. The 'data acquisition' process 301 stores the social interaction information, which includes information identifying the on-line entities involved in the communication or act, when the social interaction information occurred, and what the social interaction information was related to.

For example, the social interaction information can be represented by interaction data such as:
 "via whisper: on Mar. 15, 2005 Aliceavt sent 3 private messages to Billavt at 3:13 pm, 3:15 pm, 3:20 pm. The message strings where 'foo', 'bar', 'gizmo'"

or
 "via action: on Mar. 15, 2005 Aliceavt and Billavt entered combat"

The 'data acquisition' process 301 can be performed by the client data harvester 207 and/or the provider data harvester 209 and serves to acquire social interaction information from the players through conversations and acts of their on-line entities as well as from the players through off-line communications. The social interaction information can be stored in memory or in other accessible storage (such as the data storage 307).

The 'analysis' process 303 can use the stored social interaction information as input to various analysis procedures. Each analysis procedure can generate a metric that represents a social aspect of the persistent virtual environment. Some embodiments provide a number of different metrics that represent different social aspects of the persistent virtual environment. These metrics include those that have been identified as representing the "health" of the persistent virtual environment.

The 'visualization' process 305 presents a visualization responsive to the metric to provide information about the persistent virtual environment. In one embodiment the presented visualization is graphically represented by one or more visualization panels (for example, a panel to display prestigious and central on-line entities; a panel to display "hot topics" that identifies most active topics of conversation between the players; etc. Examples of visualization panels are provided by FIG. 13 through FIG. 18 with their accompanying text.

In some embodiments, the 'data acquisition' process 301 and/or the 'analysis' process 303 are ongoing processes (for example threads, tasks, etc.) that continually or periodically execute. Other conceived-of embodiments use event driven invocation of the processes.

In some embodiments, the social interaction information can include a presence state value (such as whether the on-line entity is virtually present when the presence history is gathered). In the case of player associations for example, the presence state value can include a participation level such as a number or percentage of the player association that are virtually present at the time of acquisition. Furthermore, the presence state value can have a positive or negative value with respect to a threshold.

Figure 4:
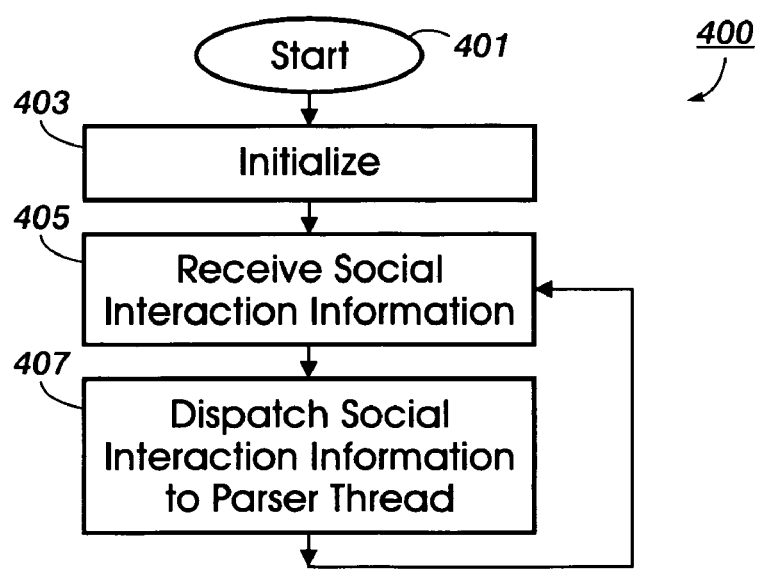
FIG. 4 illustrates a social interaction information dispatch process.

FIG. 4 illustrates a 'social interaction information dispatch' process 400 that dispatches, for subsequent processing, the social interaction information related to on-line entities. Once invoked, the 'social interaction information dispatch' process 400 initiates at a start terminal 401 and continues to an 'initialization' procedure 403 to initialize variables and/or perform any needed initialization such as allocating resources, establishing network connections, logging in to the virtual world server(s) 203, etc. Then the 'social interaction information dispatch' process 400 continues to a 'receive social interaction information' procedure 405 that can invoke an API or other interface technology to access the virtual world server(s) 203 and waits to receive the social interaction information between an on-line entity and an audience of one or more on-line entities). Once the social interaction information is received, a 'dispatch social interaction information to parser thread' procedure 407 dispatches the social interaction information to be processed by a parser (such as is subsequently described with respect to FIG. 5). After dispatching the social interaction information, the 'social interaction information dispatch' process 400 returns to the 'receive social interaction information' procedure 405 to receive the next the social interaction information from the virtual world server(s) 203.

The 'social interaction information dispatch' process 400 can be invoked as a result of a boot of the client data harvester 207 or the provider data harvester 209, by an operator or batch command, or in any other way known to one skilled in the art. One skilled in the art will understand that the functionality of the 'social interaction information dispatch' process 400 can be tightly incorporated into the virtual world server(s) 203 itself and need not be performed on a separate processor or as a separate process.

One embodiment provides a pool of identical threads each of which can parse the social interaction information. In this embodiment, each thread determines the type of the social interaction information when it is received and parses the social interaction information accordingly. Other embodiments maintain a pools of threads where the threads in each pool are used to parse a particular type of the social interaction information. In these embodiments, the 'dispatch social interaction information to parser thread' procedure 407 determines the social interaction information type and dispatches the social interaction information for parsing.

A separate process (not shown) can be used to gather social interaction information from sources that are not directly accessible from the persistent virtual environment (such as a newsgroup or forum related to the persistent virtual environment). One skilled in the art, after reading the teachings within, will understand how to access and analyze information from such a source.

Figure 5:
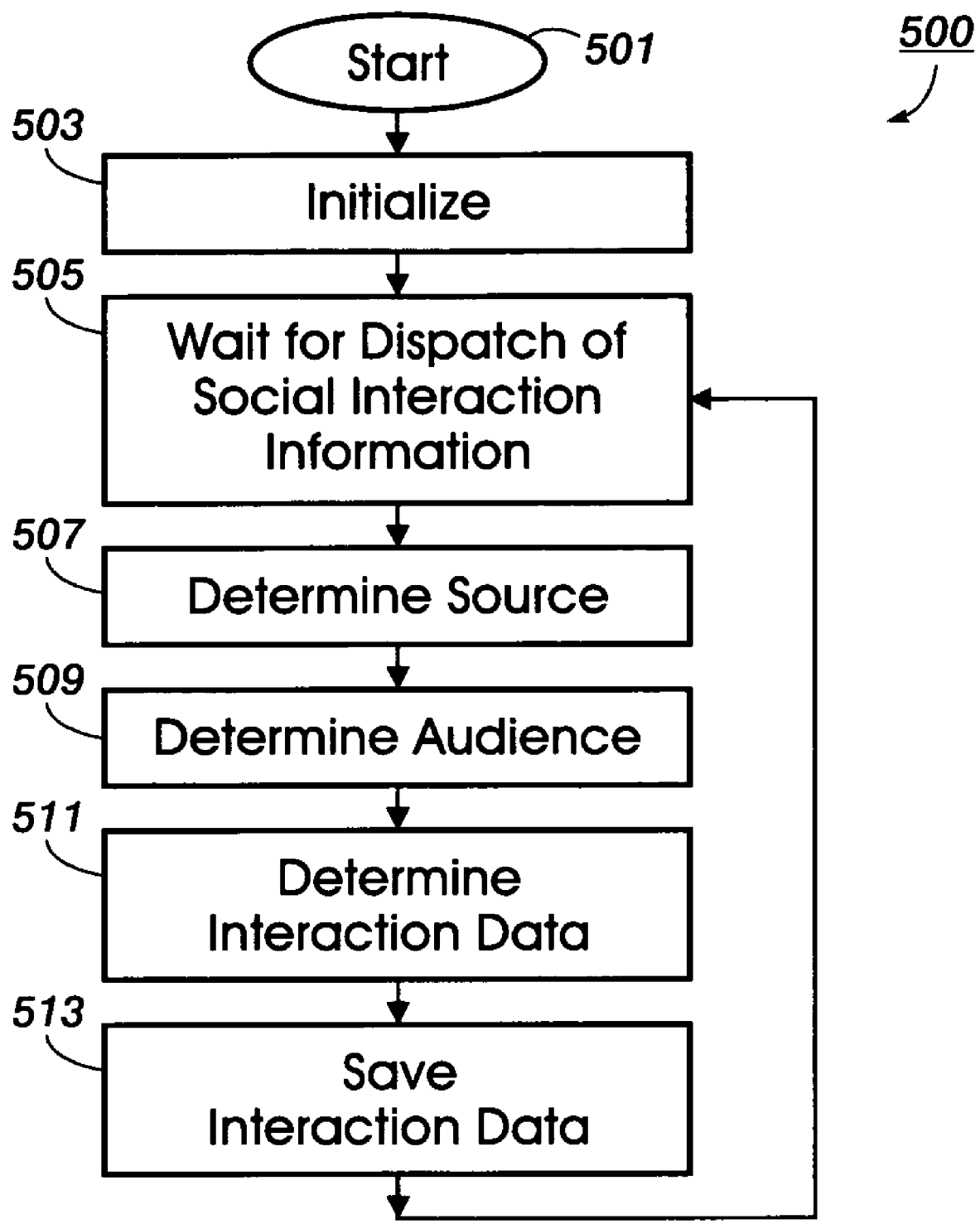
FIG. 5 illustrates social interaction information parser process.

FIG. 5 illustrates a 'social interaction information parser' process 500 that can be invoked by the 'initialization' procedure 403 when initializing one or more pools of parser threads for use by the 'social interaction information dispatch' process 400. Once invoked, the 'social interaction information parser' process 500 initiates at a start terminal 501 and initializes at an 'initialization' procedure 503. Once initialized, the 'social interaction information parser' process 500 continues to a 'wait for dispatch of social interaction information' procedure 505 that pauses the thread until social interaction information is dispatched to the thread by the 'dispatch social interaction information to parser thread' procedure 407. Once the 'wait for dispatch of social interaction information' procedure 505 receives the social interaction information, the 'social interaction information parser' process 500 continues to a 'determine communication source' procedure 507 that determines a communication source for the social interaction information; a 'determine audience' procedure 509 that determines which on-line entities received the social interaction information; and a 'determine interaction data' procedure 511 that extracts interaction data from the relevant the social interaction information. Once the 'determine communication source' procedure 507, the 'determine audience' procedure 509 and the 'determine interaction data' procedure 511 complete, the 'social interaction information parser' process 500 continues to a 'save interaction data' procedure 513 that saves the parsed social interaction information as the interaction data in, for example, the storage system 115. Then the 'social interaction information parser' process 500 continues to the 'wait for dispatch of social interaction information' procedure 505 to wait for the next social interaction information.

The social interaction information is generally text (but can, for example, be text generated from a speech recognition component) between an on-line entity and an audience, as well as descriptive text resulting from an emote and/or action command. This synchronous information can include, for example but without limitation, identification of the involved on-line entities, when the communication was passed, how long the communication lasted, the communication mode (such as instant message, gesture, emote, communication channel (such as a guild communication channel)). The social interaction information can also be an asynchronous communication between players either within or external to the persistent virtual environment such as e-mail, newsgroup or forum postings as well as user ratings, notes, reviews, group affiliations, rankings and the like. In addition, the social interaction information can include demographic information related to account holders. The social interaction information can also include features extracted from an audio or video stream, such as duration, number of phrases, intensity of emotion, etc.

Social interaction information can also be inferred from other indicators that do not require direct communication between the parties. For example, but without limitation, behavioral information (such as that information relating to the player participating in joint activities) can be inferred from a "grouped" marker indicating that two or more players have formed a party; and from co-location in the game world (such as if two players tend to visit the same location in the persistent virtual environment—such as the same "tavern" in a city—and optionally overlapping in time). Social interaction information can also be inferred from a player's "friend list" (a list of past in-game contacts). Social interaction information can also be inferred from indirect interactions such as when players exchange goods through the mediation of an "auction house" or any other in-game marketplace.

The 'determine communication source' procedure 507 determines the communication source, for example, by determining where the information was acquired (such as from a chat channel within the persistent virtual environment, or from an external forum or newsgroup). Often this information will be provided within the provided social interaction information. Sometimes this information will be deduced by identifying the source of the information.

Some embodiments include the capability (for example, by using natural language processing) to determine whether the communication is between the players themselves or between the on-line entities controlled by the players (non-role playing communication vs. role playing communication).

The 'determine audience' procedure 509 determines the audience, for example, by tracking which on-line entities are in sufficiently close proximity to a public communication initiated by an on-line entity using a particular command mode (for example via a whisper command, a yell command, or a default communication command).

The interaction data can also be stored, for example, as a series of affiliation matrices where the value at each coordinate (x, y) indicates the amount of a given interaction over a given period of time between players X and Y. This value can be linked to the social interaction information used to produce the affiliation matrix for subsequent in-depth analysis. One skilled in the art will understand that information can also be stored using database techniques.

The 'analysis' process 303 computes metrics that represent the health of the persistent virtual environment. While the following discussion is directed to examples where the persistent virtual environment is a MMOG, one skilled in the art will understand that the analysis techniques disclosed herein apply to any persistent virtual environment that enables social interaction between the players participating in the persistent virtual environment as on-line entities.

A metric can be classified as a status metric or a predictive metric. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

The predictive metric can, for example, evaluate the change in a status metric over time. Example predictive metrics include, without limitation: a churn metric, a compatibility metric, a scheduling metric, a content consumption metric, an environmental balance metric, a survival metric, and an economic metric. "Churn" metrics predict the probability of a player leaving the persistent virtual environment, based on the player's past interaction patterns. Compatibility metrics indicate whether or not a player's playstyle will match a proposed player association or whether the player's playstyle matches that of the player association to which he/she is a member. Scheduling metrics predict the probability of a player being available for a future joint activity, so that such activities can be planned in advance. Content consumption metrics predict when players will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a player association.

The predictive metrics can include those that develop a time-series of single or combinations of status metrics (weighted or un-weighted) that represent trends; metrics that represent heuristically determined conditions relevant to the predicted health of the persistent virtual environment; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful on-line entities.

The classification of the on-line entities can utilize a Bayesian network, spectral analysis, nearest neighbor techniques or any other classification mechanism.

The predictive metrics can timely measure the social aspects of player interactions in the persistent virtual environment, and measure and/or monitor the health of the online player community in a persistent virtual environment. By using the predictive metrics, the MMOG provider can alter the persistent virtual environment to encourage desired social interactions and to discourage less desired social interactions.

One skilled in the art of Social Network Analysis will understand that the metrics can be these used in the Social Network Analysis art. One example of what is known in the art of Social Network Analysis is provided by *Social Network Analysis: Methods and Applications*, by Wasserman, 2., & Frost, K. (1994), Cambridge University Press. Some of these metrics are briefly described below. These metrics allow the MMOG providers to understand the role played by each player in the persistent virtual environment. Valuable roles (e.g. leaders holding groups of players together, thereby increasing the quality of their social experience in the persistent virtual environment) can be encouraged with incentives; and problematic roles (for example, players disrupting a group's cohesion) can be eliminated. The following metrics can all assist in detecting these roles.

A "prominence" metric represents the ties to the on-line entity that make the on-line entity particularly visible to other on-line entities in the persistent virtual environment. The prominence metric is computed by evaluating direct and adjacent ties, and also indirect paths involving intermediaries.

A "centrality degree" metric indicates the amount the other on-line entities recognize that a specific on-line entity is well socially well connected and serves as a major information channel.

A "cohesive subgroup" metric indicates subsets of on-line entities among whom there are relatively strong, direct, intense, frequent or positive ties (for example, mutuality of ties, frequency of ties, frequency of ties among on-line entities within the subgroup as compared to on-line entities who are not within the subgroup). In this context, a "tie" is a way of representing a social relationship between two entities, where the relationship is based on some type of information transfer (symmetric or asymmetric) between the entities.

A "leadership" metric can be computed from standard social network metrics such as prestige and centrality.

A "strength of ties" metric represents the density of connections within clusters of on-line entities, the size of these clusters, and the overall social network structure.

An "interactivity" metric represents the average number of utterances, average size of utterance, average length of interactions, number of unique versus repeated utterances and interactions, etc. This metric can be determined relevant to a specific one of, or subset of, on-line entities. It can also be determined relevant to a specific location in the persistent virtual environment.

A "social accounting" metric indicates an on-line entity's social importance (as determined, for example, from network centrality, rate of advancement, items they own or other heuristically determined characteristic).

A "topics of interaction" metric can be obtained from text mining of the on-line entity's utterances. their bios, or from the forums, etc. The topics can be determined by using natural language processing. For example, one can perform topic extraction from the corpus of text messages typed by the players based on a thesaurus. One can also build a semantic network by extracting words that frequently co-occur, thereby identifying associations between concepts as expressed by the players (for example, if the words "paladin"—a character class—and "unbalanced" frequently co-occur, this might be an indication of a design flaw in the persistent virtual environment).

A "role" metric can be developed from combinations of the above metrics. For example, an on-line entity can serve one or more roles. These roles can include "helper," "expert," "philosopher," "comic," "griefer," "facilitator," "socializer", etc.

A "gameplay" metric indicates the number of on-line entities within a given character class, having a given level, within a persistent virtual environment geographical zone, those owing particular articles etc.

The metrics allow time series analysis of aspects of the persistent virtual environment based on where and when on-line entities are virtually present and so enables the MMOG provider to recommend and/or encourage formation of optimal groupings of on-line entities (for example by encouraging development of a player association or to optimize load across servers based on activities of on-line entities).

The metrics also allow the MMOG provider to model the impact of modifications to the persistent virtual environment by predicting consequences of the modification. In addition, the social accounting metric can be used to 1) prioritize the work of "customer service representatives" (the people who handle complaints)—important players get VIP treatment; 2) target key players for retention if they show any sign of leaving persistent virtual environment.

The metrics also allow the MMOG provider to detect and remove griefers or other players who exhibit fraudulent and/or deviant behavior.

Figure 6:
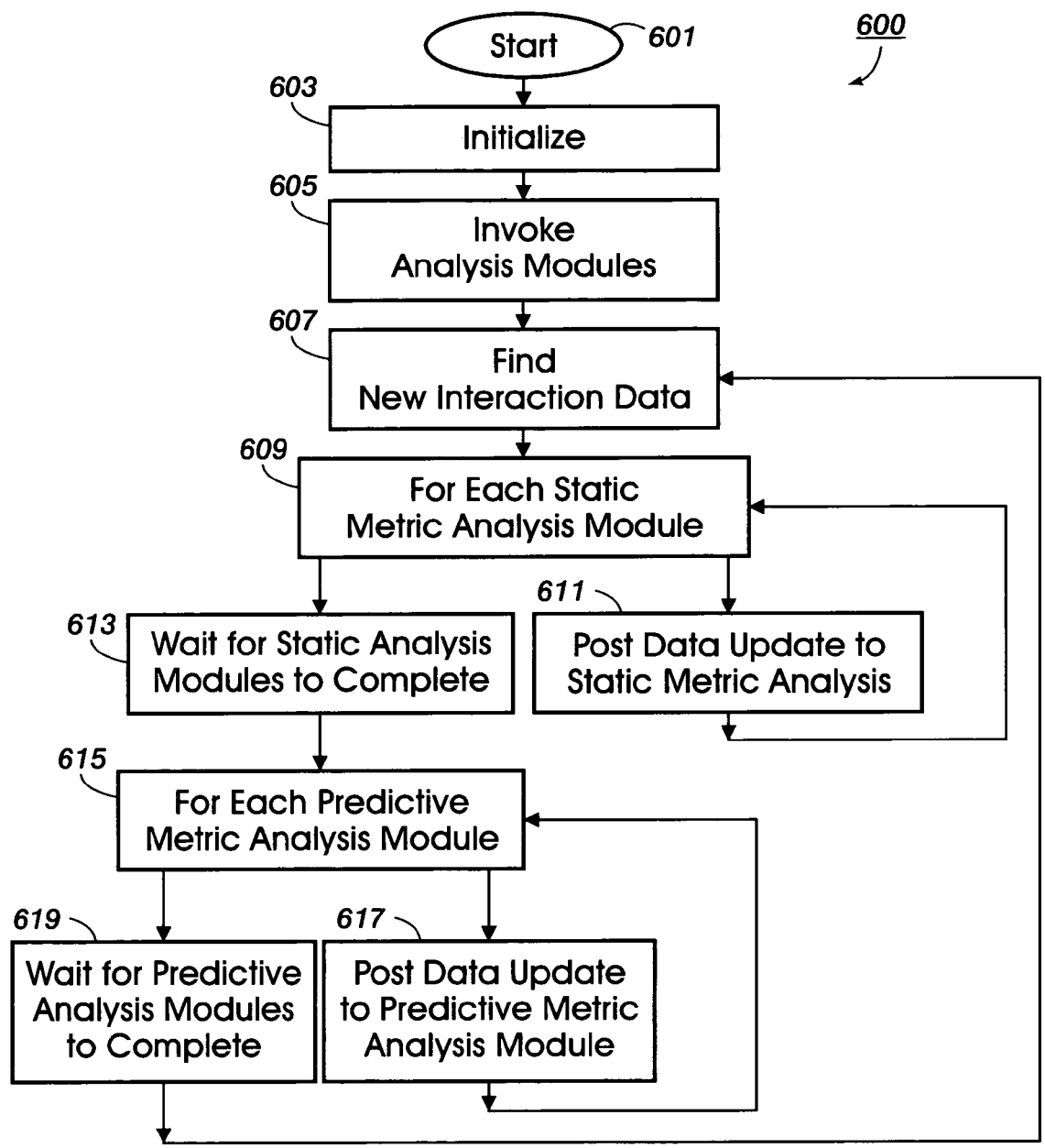
FIG. 6 illustrates the analysis process of FIG. 3.

FIG. 6 illustrates an analysis process 600 that can be used for the 'analysis' process 303 of FIG. 3. The analysis process 600 initiates at a start terminal 601. Once initiated, the analysis process 600 continues to an 'initialization' procedure 603 that performs any required initialization. An 'invoke analysis module threads' procedure 605 can then invoke analysis threads such as the thread described with respect to FIG. 9 and/or FIG. 10. A 'find new interaction data' procedure 607 determines what new interaction data has been gathered since its previous execution. Each static metric analysis thread is iterated by an 'iterate over static metric analysis modules' procedure 609 and a data update event is posted to the iterated thread by the 'post data update to static metric analysis thread' procedure 611.

Once all the data update events have been posted to the static metric analysis threads, a 'wait for static metric analysis threads' procedure 613 waits for the static metric analysis threads to complete incorporating the new social interaction information into the metrics computed by the static metric analysis modules implemented by the static metric analysis threads. Once all the static metric analysis threads complete processing, the analysis process 600 continues to an 'iterate over predictive metric analysis modules' procedure 615. The 'iterate over predictive metric analysis modules' procedure 615 iterates each predictive metric analysis thread. A 'post data update to predictive metric analysis thread' procedure 617 posts a data update event to the iterated thread so that the corresponding predictive metric analysis module can process the new social interaction information in light of changes in the static metric analysis metrics (and/or in light of the new interaction data). The analysis process 600 then continues to a 'wait for predictive metric analysis threads' procedure 619 to wait for the predictive metric analysis threads to complete. Once they complete, the analysis process 600 loops back to the 'find new interaction data' procedure 607.

The 'find new interaction data' procedure 607 can include a delay to limit the computational burden of the analysis process 600.

Figure 7:
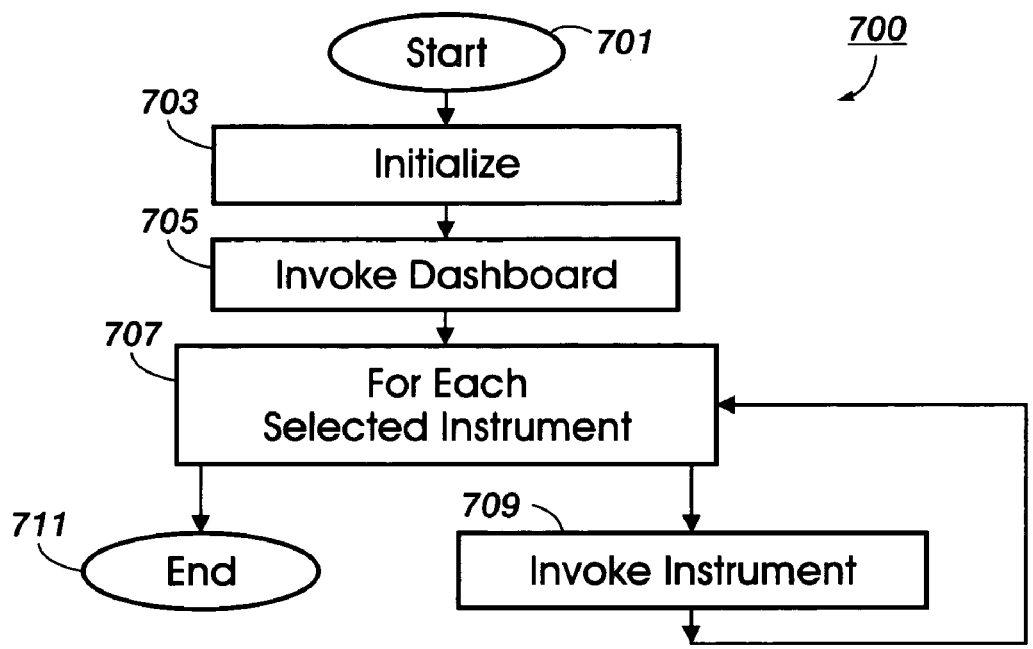
FIG. 7 illustrates a visualization background process shown in FIG. 3.

FIG. 7 illustrates a visualization background process 700 that can be used as the 'visualization' process 305 shown in FIG. 3. The visualization background process 700 can be invoked when the system starts, initiates at a start terminal 701, and is initialized by an 'initialization' procedure 703. An 'invoke dashboard' procedure 705 invokes the dashboard display thread that is subsequently described with respect to FIG. 11. An 'iterate selected instruments' procedure 707 iterates each instrument that has been selected for display. For each iterated instrument, an 'invoke instrument' procedure 709 starts a thread associated with that instrument as is subsequently described, for example, with respect to FIG. 12. The visualization background process 700 completes through an end terminal 711.

Figure 8:
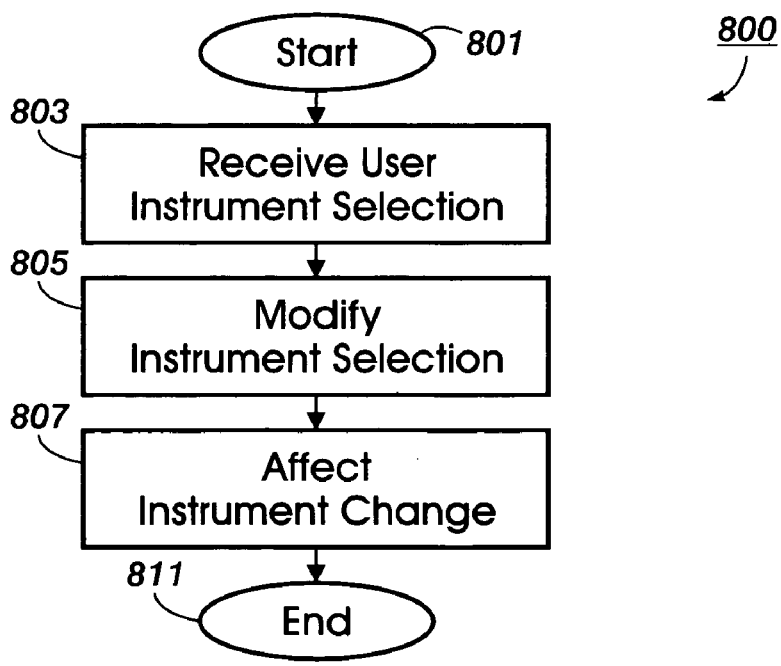
FIG. 8 illustrates an instrument selection process.

The instrument selection presented within the dashboard can be specified by a preference, user command or other techniques known in the art. For example, FIG. 8 illustrates an instrument selection process 800 that can be used to change the presented instruments. The instrument selection process 800 can be invoked by a user prior to, or subsequent to invoking the visualization background process 700. The instrument selection process 800 initiates at a start terminal 801, receives the user's instrument selection at a 'receive user instrument selection' procedure 803 and modifies the instrument preferences specification if needed by a 'modify instrument selection' procedure 805. If the dashboard has been invoked by the 'invoke dashboard' procedure 705, an 'affect instrument change' procedure 807 posts the required events to the dashboard to effect the user's change of the instrument. The instrument selection process 800 completes through an end terminal 811.

Figure 9:
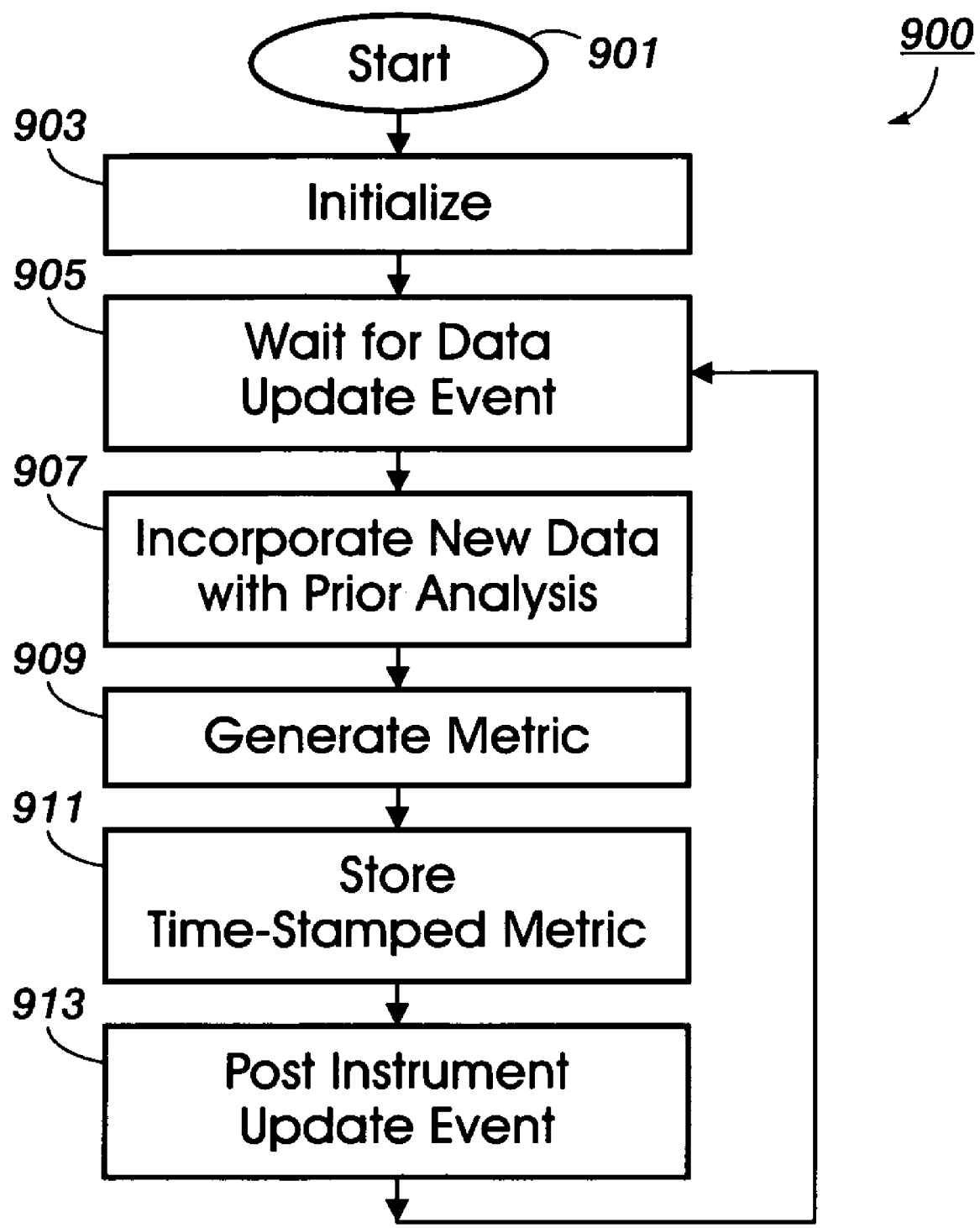
FIG. 9 illustrates a static metric analysis process.

FIG. 9 illustrates a static metric analysis process 900 that can be used to compute one or more static metric values. The static metric analysis process 900 can be invoked by the 'invoke analysis module threads' procedure 605, initiates at a start terminal 901, initializes at an 'initialization' procedure 903 and waits for a data update event from the 'post data update to static metric analysis thread' procedure 611 of FIG. 6 at a 'wait for data update event' procedure 905. Once the data update event is caught, the 'wait for data update event' procedure 905 drains any other pending data update events and continues to an 'incorporate data' procedure 907 that accesses the new interaction data stored by the 'save interaction data' procedure 513 between the previous and current execution of the static metric analysis process 900. The 'incorporate data' procedure 907 processes the new interaction data and, optionally, any other data required to compute the static metric. A 'generate metric' procedure 909 generates the static metric from the information provided by the 'incorporate data' procedure 907. The static metric is time-stamped and stored by a 'save time stamped metric' procedure 911, which makes the static metric available to other threads. A 'post instrument update event' procedure 913 then posts an instrument update event to cause any instrument using the static metric to update its presentation. The static metric analysis process 900 returns to the 'wait for data update event' procedure 905 for further processing.

Storing a time-stamped static metric as a snapshot enables subsequent analysis on the metric at a particular time, by aggregating several snapshots and performing statistical analysis of the metric, or by determining a predictive metric based on how a static metric changes over time.

Figure 10:
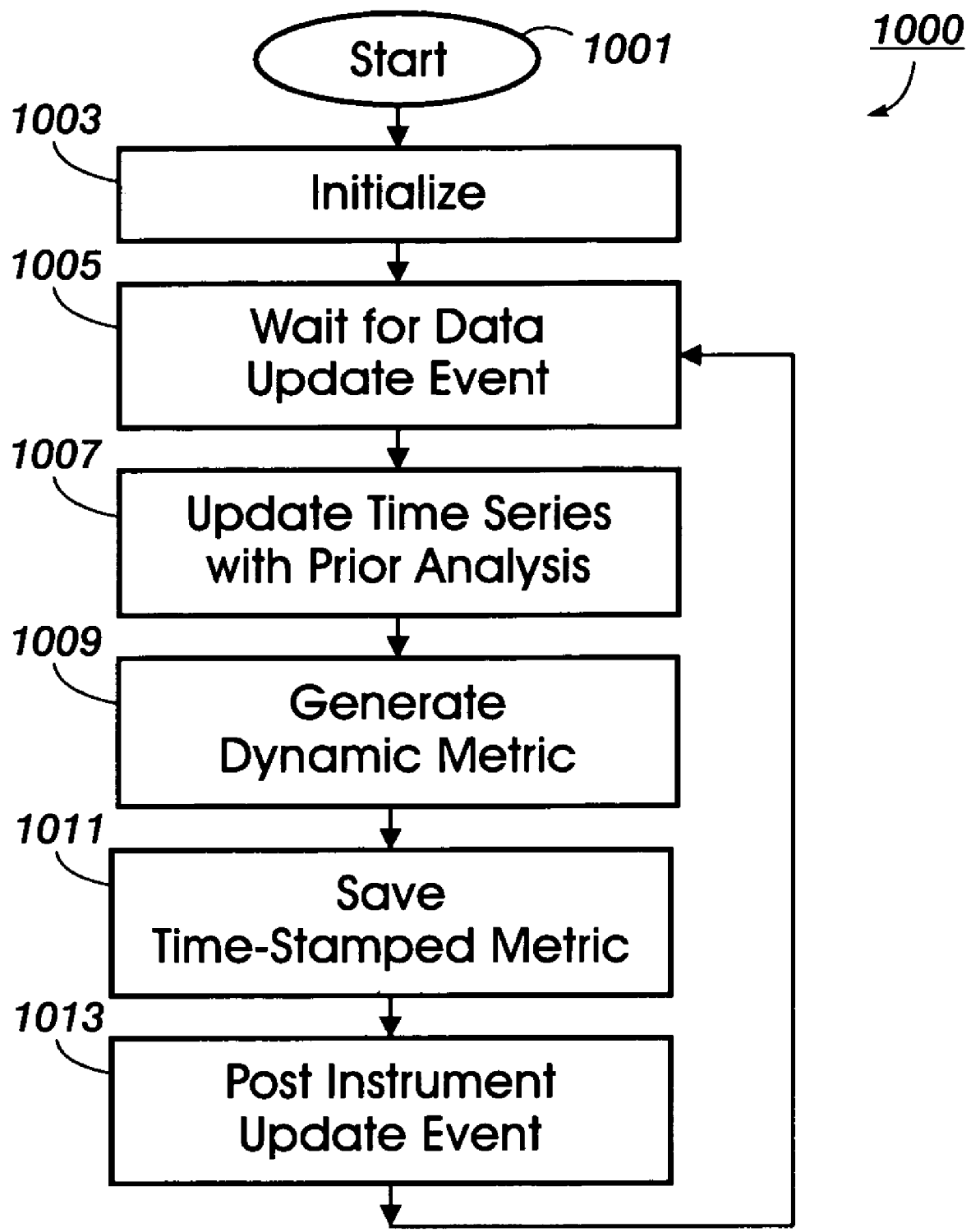
FIG. 10 illustrates a predictive metric analysis process.

FIG. 10 illustrates a predictive metric analysis process 1000 that can be used to compute one or more predictive metric values. The predictive metric analysis process 1000 can be invoked by the 'invoke analysis module threads' procedure 605, initiates at a start terminal 1001, initializes at an 'initialization' procedure 1003 and waits for a data update event from the 'post data update to predictive metric analysis thread' procedure 617 of FIG. 6 at a 'wait for data update event' procedure 1005. Once the data update event is caught, the 'wait for data update event' procedure 1005 drains any other pending data update events and continues to an 'update time-series with prior analysis' procedure 1007 that can access the new social interaction information stored by the 'save interaction data' procedure 513 between any prior and current execution of the predictive metric analysis process 1000. The 'update time-series with prior analysis' procedure 1007 processes the new social interaction information and, optionally, any other data required to generate the predictive metric (for example, but without limitation, one or more of the static metrics). A 'generate predictive metric' procedure 1009 generates the predictive metric from information provided by the 'update time-series with prior analysis' procedure 1007. The predictive metric is time-stamped and stored by a 'save time stamped predictive metric' procedure 1011, which makes the predictive metric available to other threads. A 'post instrument update event' procedure 1013 then posts an instrument update event to cause any instrument using the predictive metric to update its presentation. The predictive metric analysis process 1000 returns to the 'wait for data update event' procedure 1005 for further processing.

One skilled in the art will understand that the 'wait for data update event' procedure 905 and the 'wait for data update event' procedure 1005 may include dependency on other events, clocks, or intervals to limit the computational burden used to generate the static metric or predictive metric.

One skilled in the art will understand that the 'post instrument update event' procedure 913 and the 'post instrument update event' procedure 1013 can also provide information used by the 'wait for static metric analysis threads' procedure 613 and the 'wait for predictive metric analysis threads' procedure 619 respectively to indicate completion of the thread to the analysis process 600.

The 'update time-series with prior analysis' procedure 1007 and the 'update time-series with prior analysis' procedure 1007 can, for many static metrics and predictive metrics can incrementally update the metrics with the new interaction data without needing to reprocess a large portion of the of the historical interaction data. However, for some of the metrics, the historical interaction data and the new interaction data are concatenated and the corresponding metrics computed from the complete or some portion of the interaction data.

The stored time-stamped metrics provide snapshots of the metric at a particular time and snapshots taken at different times can be compared. These snapshots also can be correlated to a time series to monitor how the metrics change over time, and/or to provide predictions based on their trends. Furthermore, the metrics can be aggregated to provide statistically significant data that indicates key relationships between the metrics (a compound metric). An example of a compound metric is a "survival" metric that can be computed by using regression techniques on weighted factors that contribute to a player association's survival. The survival metric can be determined from the player association size, density, and the number of isolated subgraphs in a social network (the isolated subgraphs in the social network represent independent subgroups in a social unit).

Figure 11:
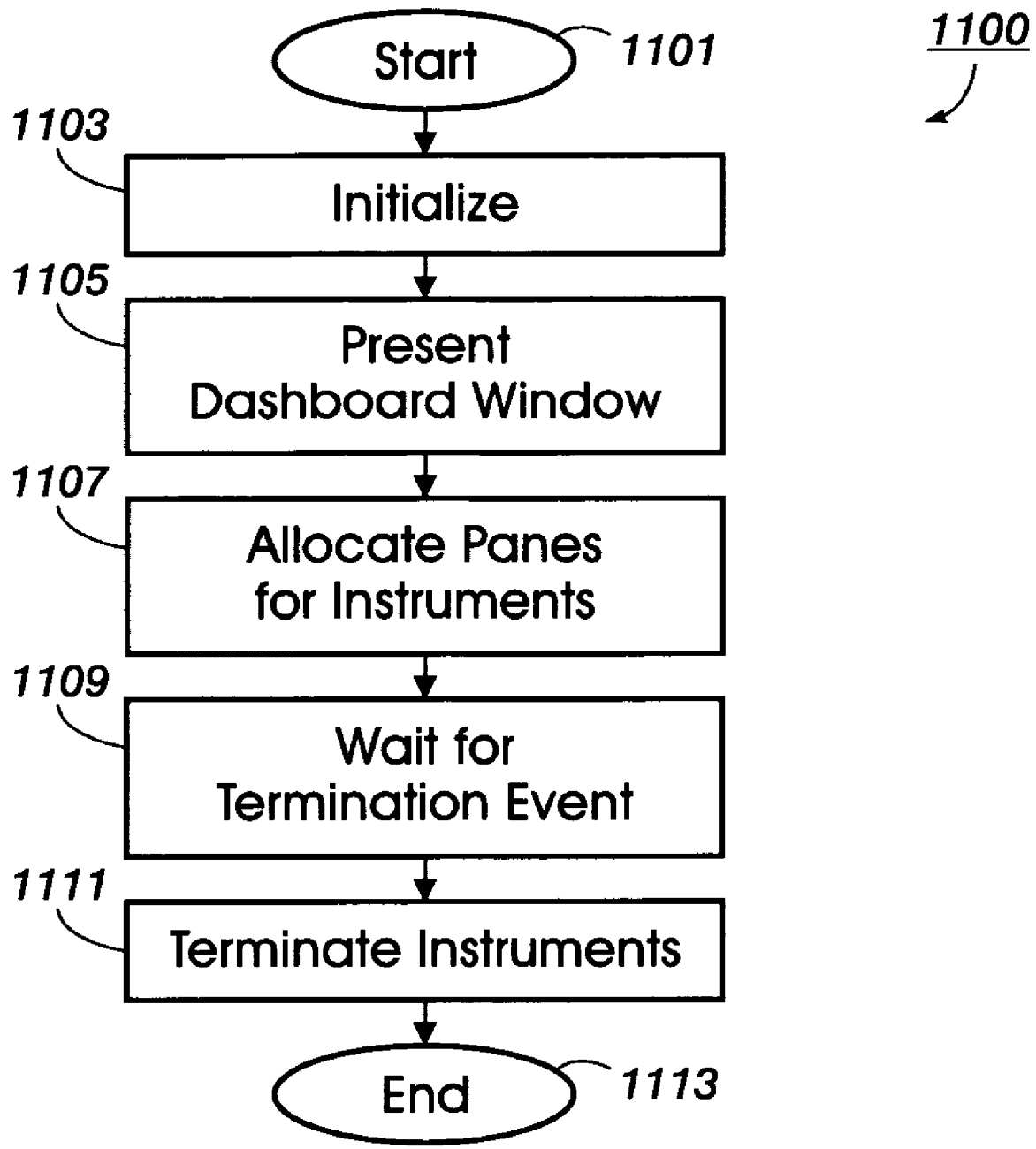
FIG. 11 illustrates a dashboard display process.

FIG. 11 illustrates a dashboard display process 1100 that can be invoked by the 'invoke dashboard' procedure 705 of FIG. 7, initiates at a start terminal 1101, and is initialized by an 'initialization' procedure 1103. Once initialized, a 'present dashboard window' procedure 1105 presents the background dashboard image and an 'allocate instrument panes' procedure 1107 allocates default panes for presentation of instrument readings. Next, the dashboard display process 1100 waits for a termination event at a 'wait for termination event' procedure 1109 and when a termination event is caught the 'wait for termination event' procedure 1109 continues to the 'terminate instrument' procedure 1111 that posts termination events to each of the instruments registered with the dashboard and, after the instruments terminate, the dashboard display process 1100 completes through an end terminal 1113.

The default panes can be deleted, reconfigured, repositioned, resized etc. as needed to accommodate the selected instruments.

Figure 12:
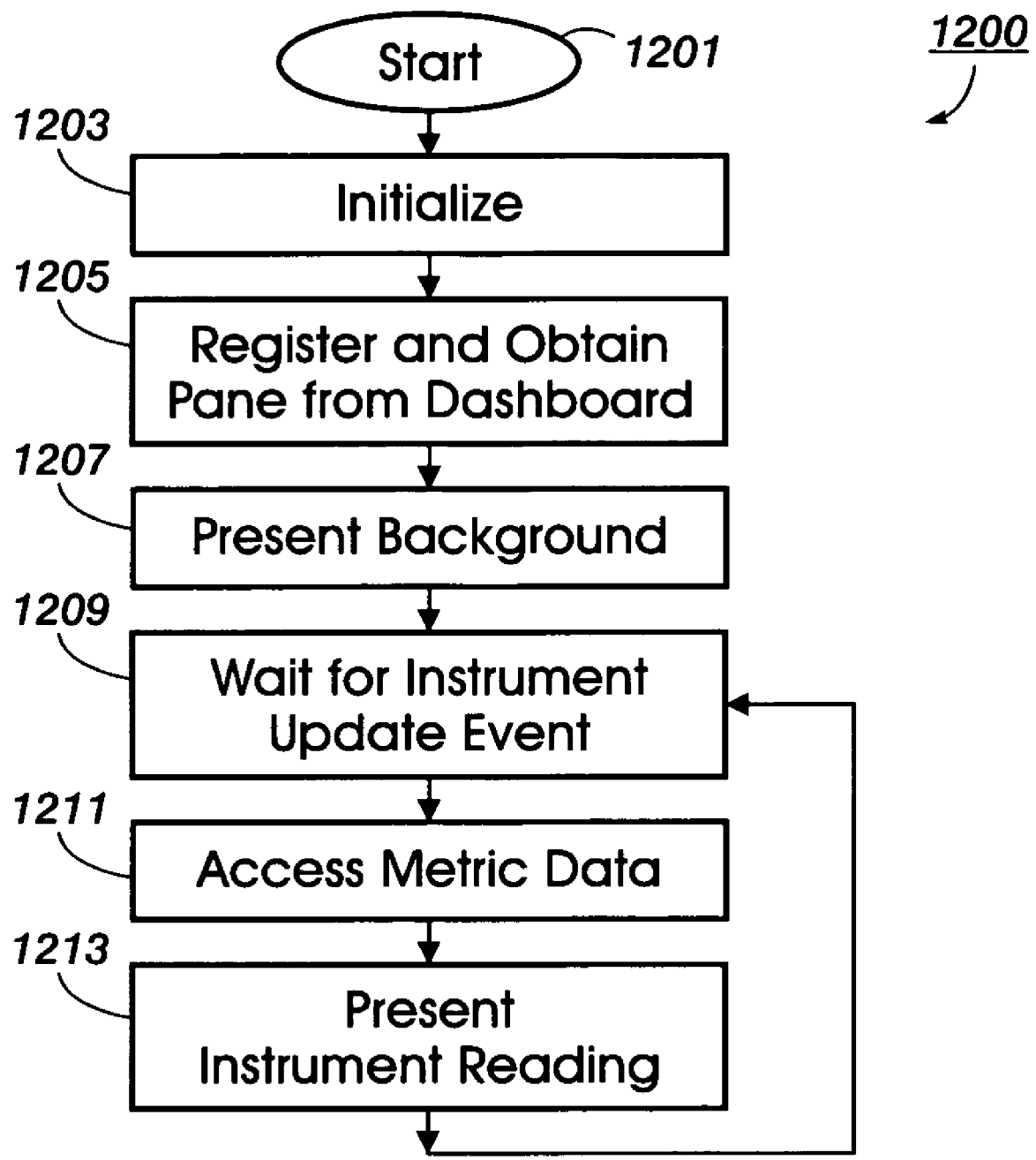
FIG. 12 illustrates an instrument process.

FIG. 12 illustrates an instrument process 1200 that can be invoked by the 'invoke instrument' procedure 709, that initiates at a start terminal 1201 and initializes at an 'initialization' procedure 1203. Once initialized, the instrument process 1200 continues to a 'register with dashboard and obtain pane' procedure 1205 that registers the instrument process 1200 with the dashboard display process 1100 and obtains a pane from the dashboard within which the instrument process 1200 can present a visual indicator. Once the pane is obtained, a 'present instrument background' procedure 1207 presents the instrument background in the pane. The instrument process 1200 continues to a 'wait for instrument update event' procedure 1209 that waits for an instrument update event such as provided by the 'post instrument update event' procedure 1013 that indicates the presented metric has changed. Once the instrument update event is caught, an 'access metric data' procedure 1211 accesses the metric data for the instrument and a 'present instrument reading' procedure 1213 computes the value to be displayed as a reading from one or more of the metrics and presents the instrument reading over the background provided by the 'present instrument background' procedure 1207. After presenting the instrument reading, the instrument process 1200 continues to the 'wait for instrument update event' procedure 1209 to await the next instrument update event.

One skilled in the art will understand that the instrument process 1200 can be terminated responsive to a termination event. Such a one will also understand that there are many ways to present the dashboard that include, for example, displaying the dashboard and instruments on a monitor, on a tangible media such as paper, as a video to a tangible storage media etc. In addition, the instrument process 1200 can also post an alert indication such as by posting an event to an appropriate process, by altering the visual indicator to show the alert indication, by invoking an audible alert indication, presenting reports, displays, etc.

One aspect of the technology provides diagnostic tools to the MMOG provider that diagnose and alter the persistent virtual environment to maintain and/or increase the subscriber motivation. By recognizing influential players or other on-line entities, and by being able to predict problems in the persistent virtual environment, the MMOG provider can take proactive actions to improve the health of the persistent virtual environment. Some of the diagnostic tools present instrument readings based on one or more of the previously described metrics.

These diagnostic tools allow the MMOG provider to explore the relationships between on-line entities (for example using network graphs such as shown in FIG. 15 through FIG. 18). The MMOG provider can also choose which interactions to observe at some level of granularity and for what period of time. The diagnostic tools provide the capability of identifying socially influential players and of recommending how the MMOG provider can encourage the identified players to actions that will improve the health of the persistent virtual environment. The tools allow the MMOG provider to investigate the rational and data that supports the tool's recommendation. Other diagnostic tools predict the health of the persistent virtual environment if the recommendations is, or is not, followed.

Some of the diagnostic tools are instruments that provide a high-level reading of the health of the persistent virtual environment or of the player associations within the persistent virtual environment. An example of such an instrument is one that displays the overall interactivity level of the on-line entities within the persistent virtual environment. Another example presents an overview of the more important metrics for the persistent virtual environment. One such metric could be those that are relevant to player associations (for persistent virtual environments where the aggregate health of the player associations correlate with subscriber retention).

The diagnostic tools can also provide warnings and alerts if there are significant changes in the social environment in the persistent virtual environment (for example, if the number of on-line entities classified as "leaders" suddenly drops).

Other diagnostic tools can detect problematic trends. One example would be that of detecting the deteriorating health of a player association, or of providing a list of player associations that are in jeopardy of disappearing. Other diagnostic tools can be used to determine the cause of a player association being in jeopardy and can recommend remedial action for the MMOG provider to improve the situation. Yet other diagnostic tools can monitor and predict subscriber churn and retention rates. Other tools allow MMOG provider to detect and police undesirable social behavior of a player in the persistent Virtual environment.

Figure 13:
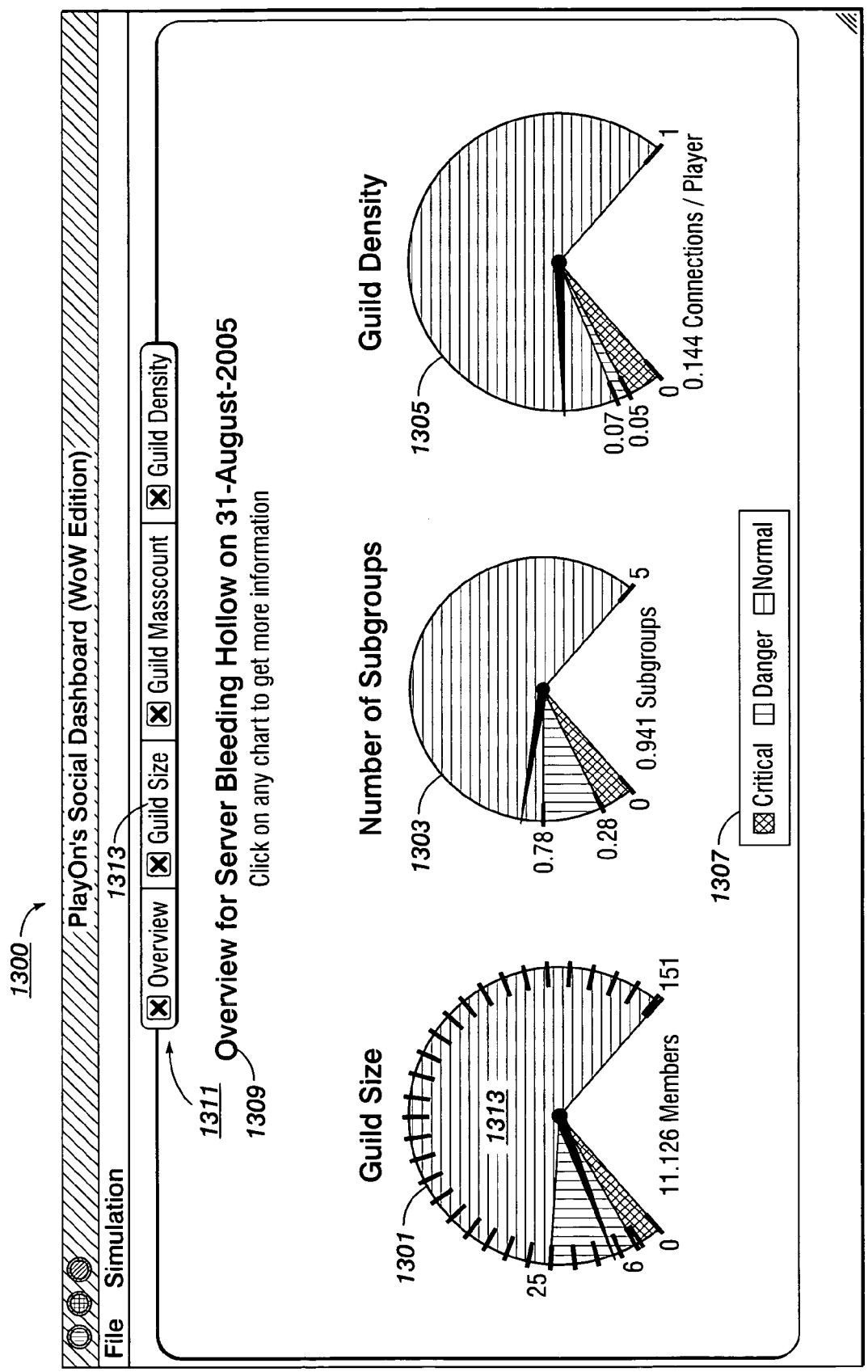
FIG. 13 illustrates a dashboard with instruments that indicate aspects of the persistent virtual environment server's health.

FIG. 13 illustrates an instrumented dashboard 1300. This particular representation includes a guild size instrument 1301, a subgroup instrument 1303, a guild density instrument 1305, a legend 1307 and a persistent virtual environment identification 1309. The persistent virtual environment identification 1309 identifies the persistent virtual environment that is being measured by the presented instruments. The legend 1307 identifies the Critical, Danger, and Normal zones of the instrument readings of the metric. In most embodiments, these zones are color coded. In FIG. 13 the different colors are indicated by different textures. The guild size instrument 1301 represents the metric that indicates the number of on-line entities who have joined a player association. The subgroup instrument 1303 represents the metric that indicates the fragmentation of the player associations. The guild density instrument 1305 represents the metric that indicates the connections between the on-line entities within the player associations.

The instrumented dashboard 1300 also includes a command bar 1311 that contains one or more controls such as a user activated control 1313 that can be activated by a user to send a selection command to present drill-down information about an aspect of one if the presented instruments. One skilled in the art will understand that there are many ways to select which instrument to provide drill-down information about. These include selecting the instrument and invoking the selection command on the selected instrument, as well as activating a control that invokes the selection command specific to an instrument (such as the user activated control 1313 that specifically drills-down into the guild size instrument 1301). The instrument image itself can also serve as the user activated control 1313.

The Critical, Danger, and Normal zones on instruments can represent computed thresholds. We perform a regression of several factors over a target-variable (one embodiment, performs a regression of the player association size metric, the player association density metric, and the number of isolated subgraphs in the player association, over a survival-variable to measure the influence of each listed metric over the survival of a player association). Using the equation resulting from the regression, the value of each factor at which the target variable changes is computed. These values are used as thresholds for the instrument (for example in on persistent virtual environment, when the player association size metric is more than 10, all other metric being equal, player associations will survive; when the player association size metric less than 5, player associations will die). These values and metric can be used to prioritize and route customer support requests to the appropriate entity at the MMOG provider who are appropriately empowered to handle the request. The support entities can also use technology described herein to understand the importance to the persistent virtual environment of the player who has made the support request and thus, to respond accordingly. Furthermore, leading indicators responsive to enhancements or changes are made to the persistent virtual environment can be monitored to allow timely remove or fix to the enhancement if there are unexpected results.

Figure 14:
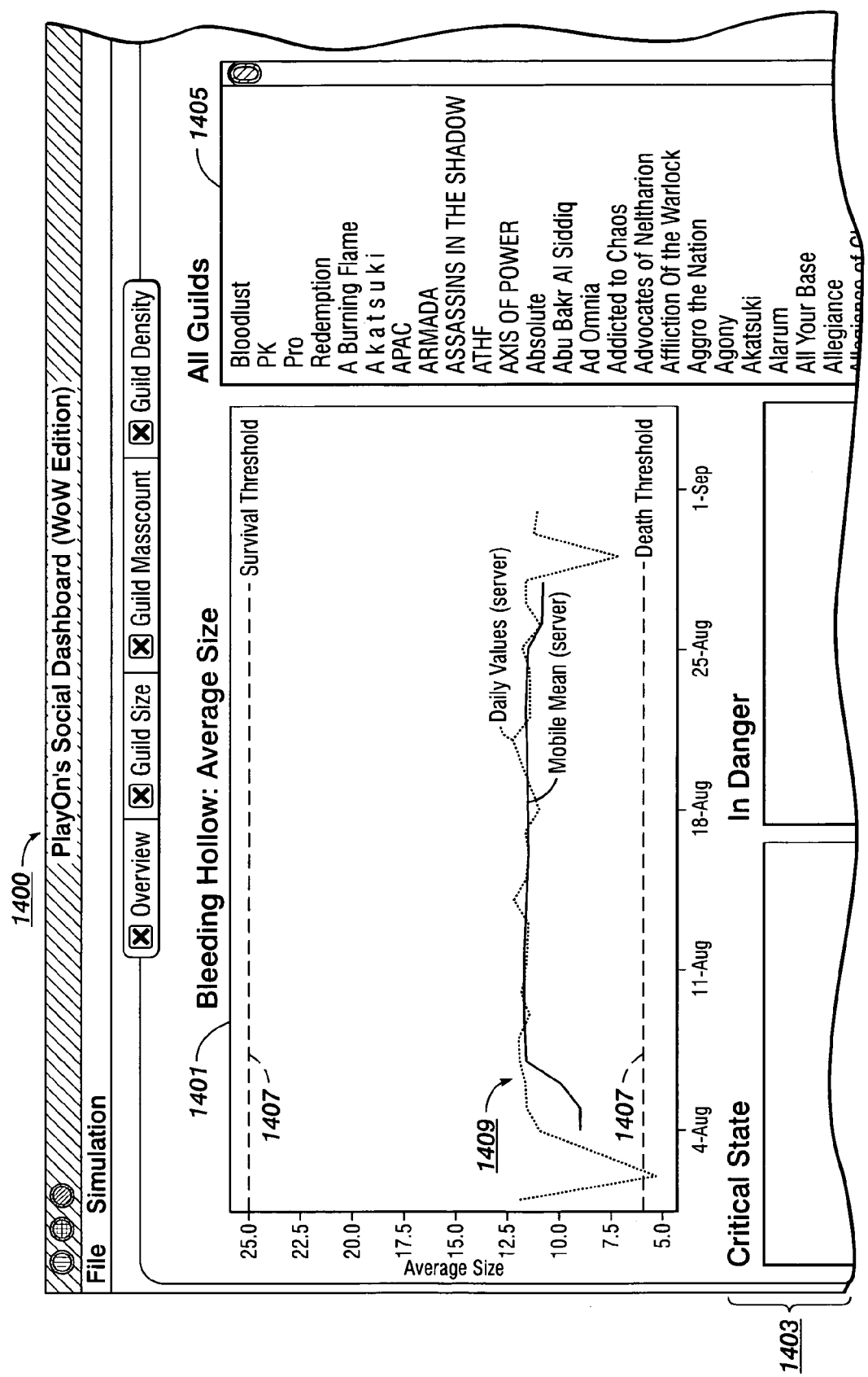
FIG. 14 illustrates a drill-down information instrument of the player association size instrument in FIG. 13.

FIG. 14 illustrates a drill-down information instrument 1400 related to the guild size instrument 1301 of FIG. 13 and shows a metric history 1401, an attention needed area 1403, a player association selection control 1405, and a threshold indicator 1407. The drill-down information instrument 1400 can be invoked from the user activated control 1313. The metric history 1401 presents the value of the metric over time. The attention needed area 1403 lists player associations that are in danger of disbanding as well as those that are critically close to disbanding. In one embodiment, the user can select any player association listed in the attention needed area 1403 to drill-down into the selected player association that needs attention. The player association selection control 1405 allows a user to display the historical metric for any specified player association(s). The threshold indicator 1407 in the metric history 1401 indicates values of the metric that are significant (for example, see the discussion related to FIG. 13. A player association size history curve 1409 plots the daily size of the player associations in the persistent virtual environment and, optionally, a smoothed mean value. The attention needed area 1403 being empty indicates that no player association are in danger of disbanding.

Figure 15:
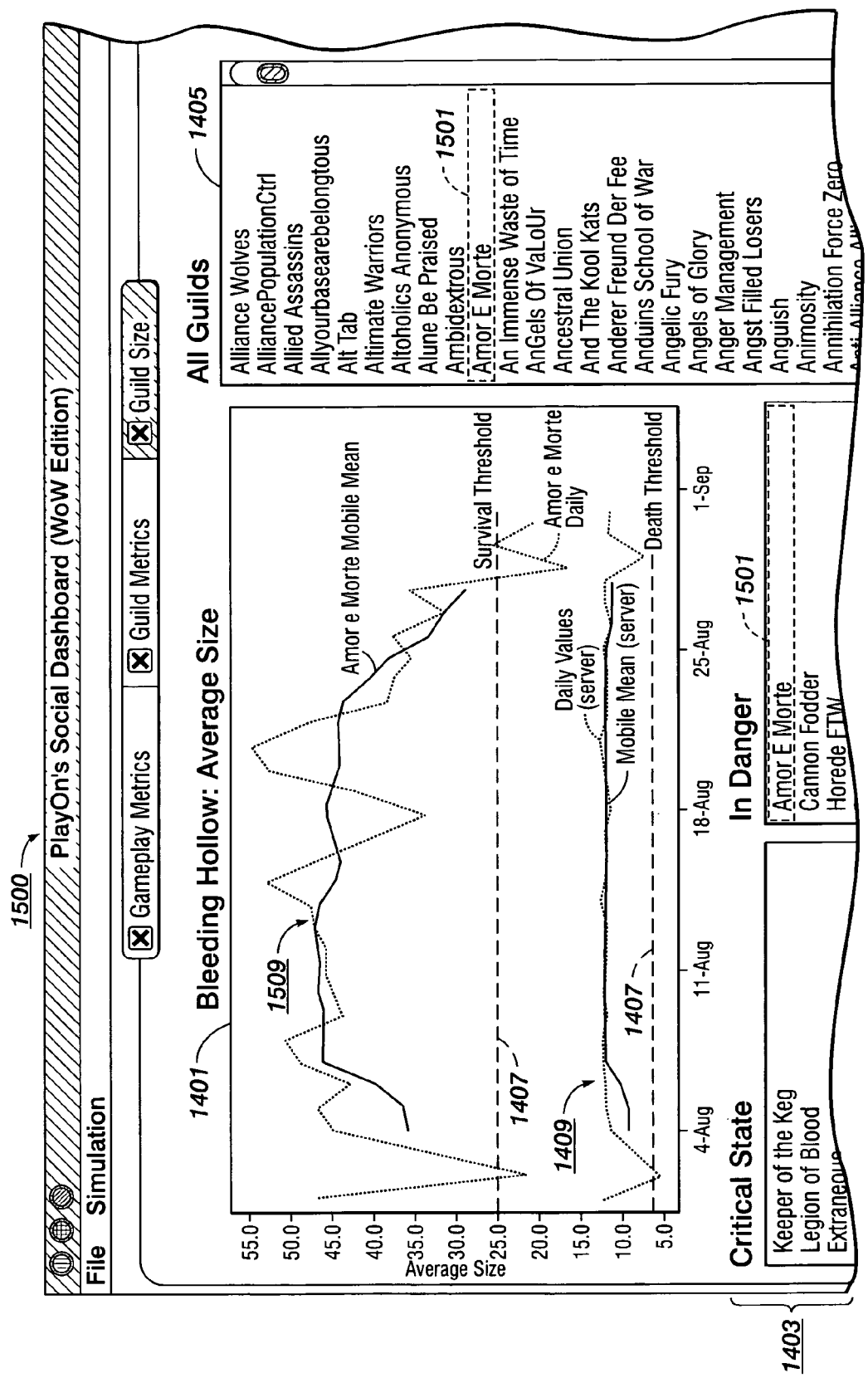
FIG. 15 illustrates the drill-down information instrument of FIG. 14 in use to compare the history of the average player association size with the history of a specified player association size.

FIG. 15 illustrates a drill-down information instrument 1500 as in FIG. 14 at a different time after a user has selected a user specified player association 1501 (named "Amor E Morte") from the player association selection control 1405 or from the "In Danger" pane of the attention needed area 1403. In one embodiment, the player association size history curve 1409 can be compared to a specified player association size history curve 1509 that plots the daily size of the specified player association and, optionally, a mobile mean value. Player associations can automatically be entered into the attention needed area 1403 by determining the trend of the predictive metric associated with the drill-down. In this figure, a number of player associations are in danger of disbanding and others are critically close to disbanding (as determined by the trend of the predictive metric associated with the size of the player association).

Once a player association is identified as needing attention, the persistent virtual environment provider can examine the history of the associated predictive metrics and static metrics to determine how best to correct the problem. For example, when the problem is with a player association, the persistent virtual environment provider can investigate the connectivity metrics associated with the player association.

Figure 16:
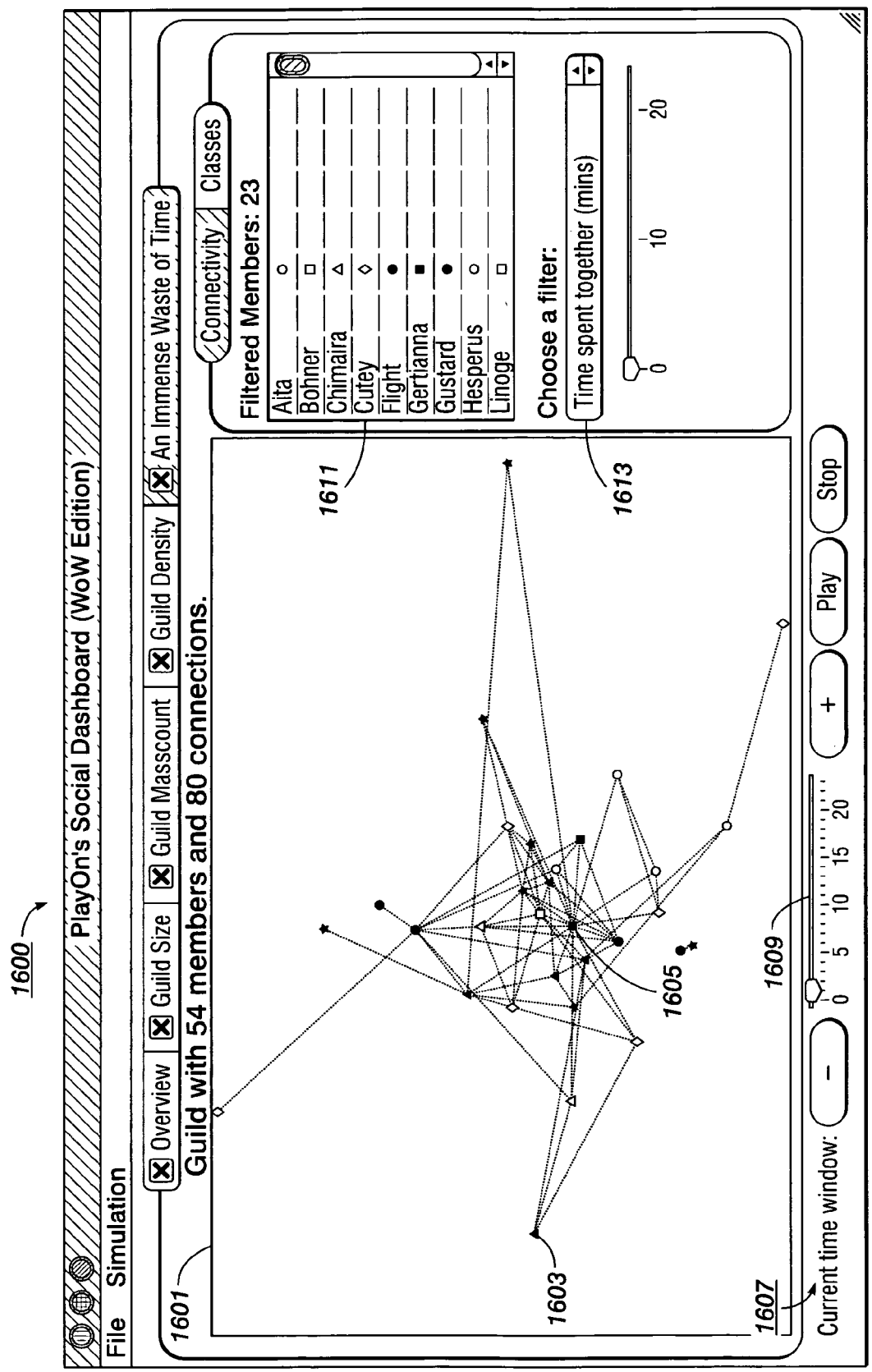
FIG. 16 illustrates an instrument that presents the connectivity of the members of the player association.

FIG. 16 illustrates a member connectivity instrument 1600 that presents drill-down information about a selected player association (in this figure, the name of the player association is "An Immense Waste of Time"—the player association name is agreed upon by the players who form the player association and this name could be any other string). The drill-down information is provided (by this instrument) as a connectivity network 1601 that represents the ties (connections) that each member in the player association has with the other members. For example, a less connected member 1603 has few connections to other members while a more connected member 1605 has many connections to other members (and has high scores on other important metrics which is represented by the placement of this member in the center of the connectivity network 1601). The member connectivity instrument 1600 can also include a playback control bar 1607 and a playback time indicator 1609 to allow a user to observe how the connectivity network 1601 changes over time. The member connectivity instrument 1600 can also include a member selection control 1611 that allows identification of, and drill-down capability to individual members of the player association; and a filter selection control 1613 that allows a user to select the amount of, and what type of information is presented in the member connectivity instrument 1600.

Figure 17:
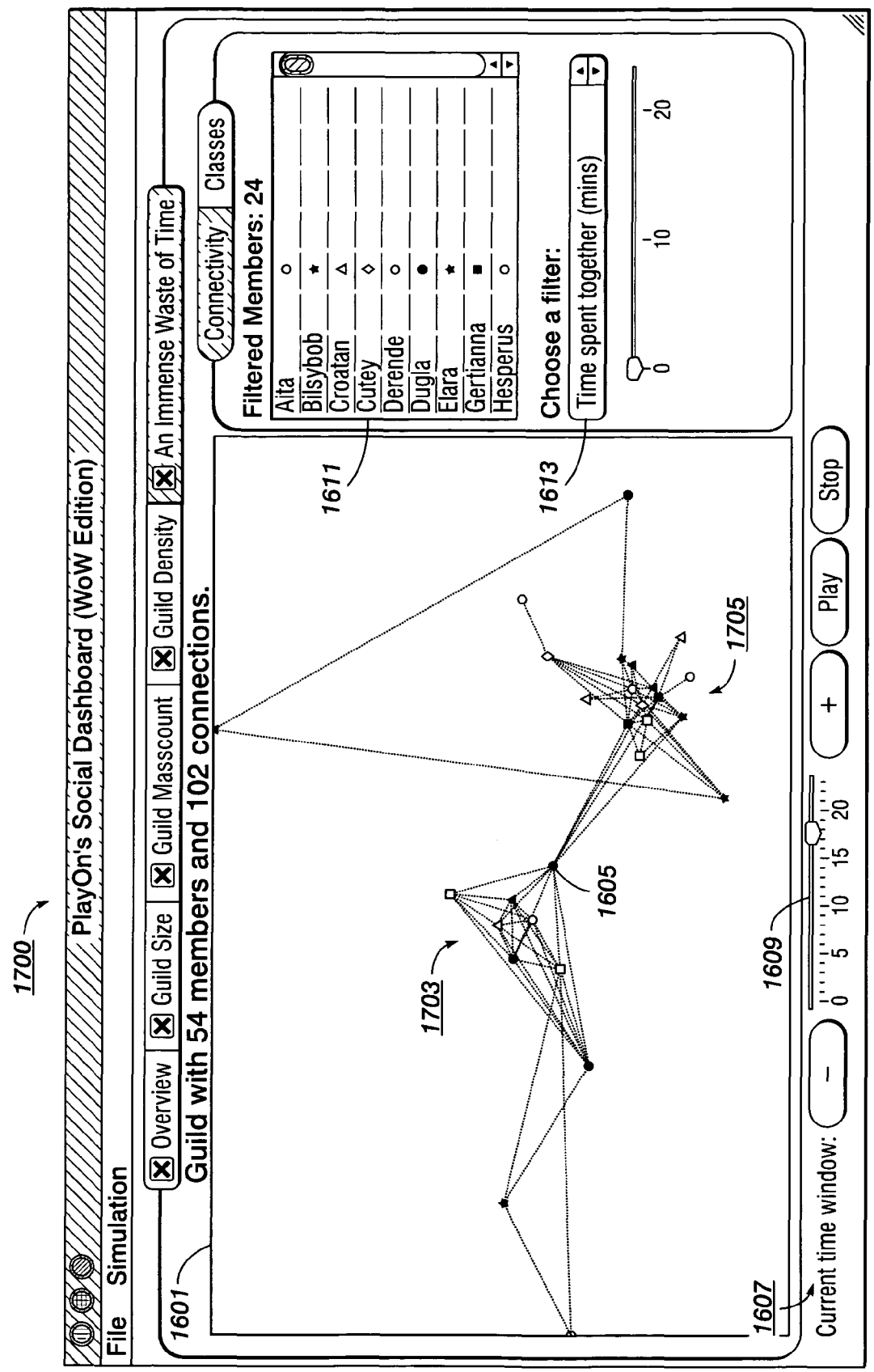
FIG. 17 illustrates the instrument shown in FIG. 16 at a second time and that indicates that the player association is fragmenting.

FIG. 17 illustrates the member connectivity instrument 1600 when presenting the connectivity network 1601 at a second time as indicated by the slider on the playback time indicator 1609. At this time, it is clear that the more connected member 1605 of the player association is the only tie between a first player association fragment 1703 and a second player association fragment 1705. The smaller the fragment, the more likely the members of the fragment will leave the player association and possibly the persistent virtual environment. The player association is likely to disband if the more connected member 1605 were to leave the player association. In addition, the more connected member 1605 is no longer in the center of either fragment (as was the case in FIG. 16) and thus, appears to have lost his leadership role in the player association.

Comparing the connectivity network 1601 of FIG. 16 with that of FIG. 17 the virtual world provider 201 can determine that a once healthy player association is starting to fragment. Thus, the virtual world provider 201 has now identified the pivotal player (or players) that can be influenced to help the player association recover. This identification can be through the use of the member selection control 1611. On selection of the more connected member 1605 in the member selection control 1611 the system will provide a recommendation to the virtual world provider 201 on how to influence or pressure the more connected member 1605 to continue in the player association.

The marketing department of a MMOG provider initially provides recommended actions Possible recommendation actions would initially be provided using heuristics. For example the initial recommendation actions for increasing player retention could include offering the subscriber: free subscription periods, free items (both in the persistent virtual environment and/or in the real world), an invitation to a special event, or any other retention incentive). The persistent virtual environment then tracks the trajectory of each player after receipt of the retention incentive and measures the effectiveness of each retention incentive and adjusts its recommendations accordingly (individually to the tracked player and/or to classes of players).

Figure 18:
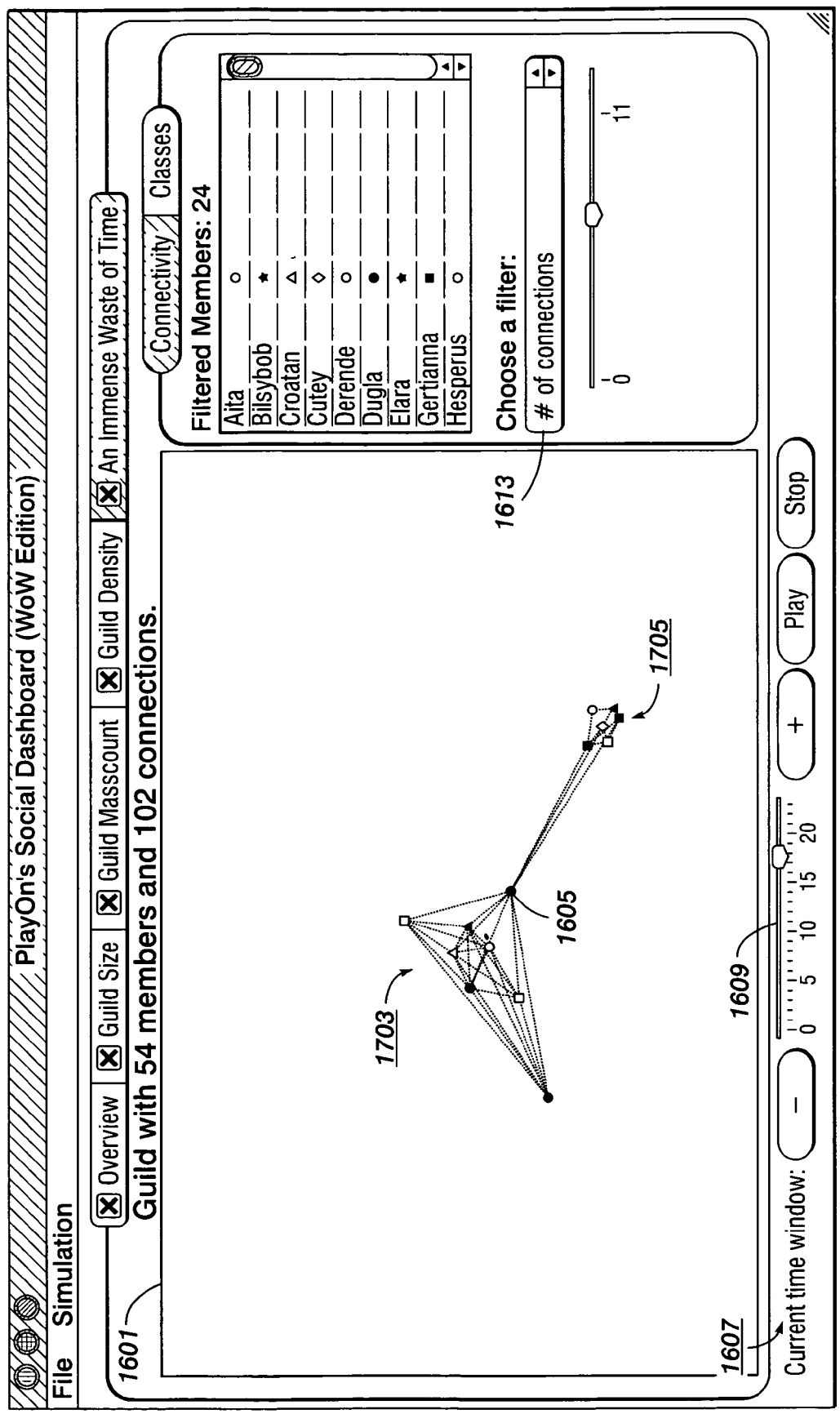
FIG. 18 illustrates the instrument shown in FIG. 17 at the second time conditioned to show the connectivity of the important members of the player association.

FIG. 18 illustrates the member connectivity instrument 1600 when presenting the connectivity network 1601 at a second time but with a filter selected by the filter selection control 1613 to present a simplified representation of the connectivity network 1601 shown in FIG. 17. In this instance, the simplified representation only includes members who have more than a specific number of connections. This representation allows the virtual world provider 201 to identify the most connected members of the player association and to take pro-active measures to engage them in the persistent virtual environment.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic. Thus, for example, a data acquisition logic can include custom electronics, a processor unit executing stored instructions, or any combination thereof.

One skilled in the art will understand that the network transmits information (such as informational data as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media or other article of manufacture, can be considered a computer-usable data carrier.

One skilled in the art will understand that the technology enables a MMOG provider to timely monitor persistent virtual environments and to measure and/or monitor the health of the online player communities within the persistent virtual environments.

From the foregoing, it will be appreciated that the technology enables a MMOG provider to (without limitation):
1) collect, track, and monitor social data of on-line entities and/or players in a persistent virtual environment;
2) track the health of social communities within a persistent virtual environment;
3) to model recommendations to improve game design;
4) model and predict subscriber churn and retention rates;
5) initiate real-time, tactical marketing programs to retain key social players and reduce subscriber churn;
6) police undesirable social behavior;
7) prioritize and route customer service requests; and
8) provide timely feedback on the impact of persistent virtual environment enhancements.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed follows:

1. A computer controlled method comprising:
   acquiring social interaction information, from a social interaction between two or more on-line entities that participate in a persistent virtual environment, without requiring an input from a user of the persistent virtual environment;
   analyzing said social interaction information to determine a metric that represents a social aspect of said persistent virtual environment, wherein the determined metric includes a predictive metric that predicts a future trend on the persistent virtual environment; and
   presenting a visualization responsive to said metric.

2. The computer controlled method of claim 1, wherein said metric is a status metric that characterizes behavioral information of one or more of said plurality of on-line entities, said behavioral information related to at least one activity of said one or more of said plurality of on-line entities within said persistent virtual environment.

3. The computer controlled method of claim 2, wherein said status metric is selected from one or more of the group consisting of a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric.

4. The computer controlled method of claim 1, wherein said predictive metric is selected from one or more of the group consisting of a churn metric, a compatibility metric, a scheduling metric, a content consumption metric, an environmental balance metric, a survival metric, and an economic metric.

5. The computer controlled method of claim 1, wherein said predictive metric is computed responsive to a time series and at least one status metric, and wherein said at least one status metric characterizes behavioral information of one or more of said plurality of on-line entities, said behavioral information related to at least one activity of said one or more of said plurality of on-line entities within said persistent virtual environment.

6. The computer controlled method of claim 1, further comprising storing a snapshot of said metric.

7. The computer controlled method of claim 6, wherein presenting said visualization further comprises aggregating said snapshot with a second snapshot.

8. The computer controlled method of claim 6, wherein presenting said visualization further comprises determining a change in said metric from said snapshot to a second snapshot.

9. The computer controlled method of claim 1, wherein said social interaction information comprises one or more of a group consisting of time information, on-line entity identification information, communication content information, communication type information, communication source information, and audience identification information.

10. The computer controlled method of claim 1, wherein presenting said visualization further comprises presenting an alert indication.

11. The computer controlled method of claim 1, wherein said visualization indicates an overall interactivity level of said plurality of on-line entities within said persistent virtual environment.

12. The computer controlled method of claim 1, wherein said visualization represents behavioral information of one or more of said plurality of on-line entities, said behavioral information related to at least one activity of said one or more of said plurality of on-line entities within said persistent virtual environment.

13. The computer controlled method of claim 1, wherein said persistent virtual environment has one or more characteristics of a group consisting of a multiplayer online game, a virtual office, a virtual resort, a social online world, a online learning system, a virtual classroom, an online training system, an online collaborative interaction space, and a virtual representation of a real world attraction.

14. An apparatus having a processing unit and a memory coupled to said processing unit comprising:
  a data acquisition logic configured to acquire social interaction information, from a social interaction between two or more on-line entities that participate in a persistent virtual environment, without requiring an input from a user of the persistent virtual environment;
  an analysis logic configured to analyze said social interaction information acquired from the data acquisition logic to determine a metric that represents a social aspect of said persistent virtual environment, wherein the determined metric includes a predictive metric that predicts a future trend on the persistent virtual environment; and
  a presentation logic configured to present a visualization responsive to said metric.

15. The apparatus of claim 14, wherein said metric is a status metric that characterizes behavioral information of one or more of said plurality of on-line entities, said behavioral information related to at least one activity of said one or more of said plurality of on-line entities within said persistent virtual environment.

16. The apparatus of claim 15, wherein said status metric is selected from one or more of the group consisting of a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric.

17. The apparatus of claim 14, wherein said predictive metric is selected from one or more of the group consisting of a churn metric, a compatibility metric, a scheduling metric, a content consumption metric, an environmental balance metric, a survival metric, and an economic metric.

18. The apparatus claim 14, wherein said predictive metric is computed responsive to a time series and at least one status metric, and wherein said at least one status metric characterizes behavioral information of one or more of said plurality of on-line entities, said behavioral information related to at least one activity of said one or more of said plurality of on-line entities within said persistent virtual environment.

19. The apparatus of claim 14, further comprising storage logic configured to store a snapshot of said metric.

20. The apparatus of claim 19, wherein the presentation logic further comprises an aggregation logic configured to aggregate said snapshot with a second snapshot.

21. The apparatus of claim 19, wherein the presentation logic further comprises a difference logic configured to determine a change in said metric from said snapshot to a second snapshot.

22. The apparatus of claim 14, wherein said social interaction information comprises one or more of a group consisting of time information, on-line entity identification information, communication content information, communication type information, communication source information, and audience identification information.

23. The apparatus of claim 14, wherein the presentation logic further comprises an alert logic configured to present an alert indication.

24. The apparatus of claim 14, wherein said visualization indicates an overall interactivity level of said plurality of on-line entities within said persistent virtual environment.

25. The apparatus of claim 14, wherein said visualization represents behavioral information of one or more of said plurality of on-line entities, said behavioral information related to at least one activity of said one or more of said plurality of on-line entities within said persistent virtual environment.

26. The apparatus of claim 14, wherein said persistent virtual environment has one or more characteristics of a group consisting of a multiplayer online game, a virtual office, a virtual resort, a social online world, a online learning system, a virtual classroom, an online training system, an online collaborative interaction space, and a virtual representation of a real world attraction.

27. A computer program product comprising:
  a computer-usable data carrier providing instructions that, when executed by a computer, cause said computer to perform a method comprising:
  acquiring social interaction information, from a social interaction between two or more on-line entities that participate in a persistent virtual environment, without requiring an input from a user of the persistent virtual environment;

analyzing said social interaction information to determine a metric that represents a social aspect of said persistent virtual environment, wherein the determined metric includes a predictive metric that predicts a future trend on the persistent virtual environment; and presenting a visualization responsive to said metric.

28. The computer program product of claim 27, wherein said metric is a status metric that characterizes behavioral information of one or more of said plurality of on-line entities, said behavioral information related to at least one activity of said one or more of said plurality of on-line entities within said persistent virtual environment.

29. The computer program product of claim 28, wherein said status metric is selected from one or more of the group consisting of a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric.

30. The computer program product of claim 27, wherein said predictive metric is selected from one or more of the group consisting of a churn metric, a compatibility metric, a scheduling metric, a content consumption metric, an environmental balance metric, a survival metric, and an economic metric.

31. The computer program product of claim 27, wherein said predictive metric is computed responsive to a time series and at least one status metric, and wherein said at least one status metric characterizes behavioral information of one or more of said plurality of on-line entities, said behavioral information related to at least one activity of said one or more of said plurality of on-line entities within said persistent virtual environment.

32. The computer program product of claim 27, further comprising storing a snapshot of said metric.

33. The computer program product of claim 32, wherein presenting said visualization further comprises aggregating said snapshot with a second snapshot.

34. The computer program product of claim 32, wherein presenting said visualization further comprises determining a change in said metric from said snapshot to a second snapshot.

35. The computer program product of claim 27, wherein said social interaction information comprises one or more of a group consisting of time information, on-line entity identification information, communication content information, communication type information, communication source information, and audience identification information.

36. The computer program product of claim 27, wherein presenting said visualization further comprises presenting an alert indication.

37. The computer program product of claim 27, wherein said visualization indicates an overall interactivity level of said plurality of on-line entities within said persistent virtual environment.

38. The computer program product of claim 27, wherein said visualization represents behavioral information of one or more of said plurality of on-line entities, said behavioral information related to at least one activity of said one or more of said plurality of on-line entities within said persistent virtual environment.

39. The computer program product of claim 27, wherein said persistent virtual environment has one or more characteristics of a group consisting of a multiplayer online game, a virtual office, a virtual resort, a social online world, a online learning system, a virtual classroom, an online training system, an online collaborative interaction space, and a virtual representation of a real world attraction.

* * * * *

UNITED STATES PATENT AND TRADEMARK OFFICE
CERTIFICATE OF CORRECTION

| | | |
|---|---|---|
| PATENT NO. | : 7,720,777 B2 | Page 1 of 1 |
| APPLICATION NO. | : 11/402568 | |
| DATED | : May 18, 2010 | |
| INVENTOR(S) | : Nicolas B. Ducheneaut et al. | |

It is certified that error appears in the above-identified patent and that said Letters Patent is hereby corrected as shown below:

Title Pg, Item (75) inventors: please replace the second inventor's middle initial "D." with the letter --J--, so his name reads: Robert J. Moore.

Signed and Sealed this

Tenth Day of August, 2010

David J. Kappos
*Director of the United States Patent and Trademark Office*